US010630695B2

(12) United States Patent
Cook et al.

(10) Patent No.: US 10,630,695 B2
(45) Date of Patent: Apr. 21, 2020

(54) SECURITY POLICY MONITORING SERVICE

(71) Applicant: Amazon Technologies, Inc., Seattle, WA (US)

(72) Inventors: John Cook, Brooklyn, NY (US); Neha Rungta, San Jose, CA (US); Catherine Dodge, Seattle, WA (US); Jeff Puchalski, Seattle, WA (US); Carsten Varming, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 15/637,238

(22) Filed: Jun. 29, 2017

(65) Prior Publication Data

US 2019/0007418 A1    Jan. 3, 2019

(51) Int. Cl.
*H04L 29/06*    (2006.01)
*H04W 12/08*    (2009.01)
*H04N 21/443*    (2011.01)

(52) U.S. Cl.
CPC .......... *H04L 63/108* (2013.01); *H04L 63/105* (2013.01); *H04L 63/20* (2013.01); *H04N 21/443* (2013.01); *H04N 21/4437* (2013.01); *H04W 12/0802* (2019.01)

(58) Field of Classification Search
CPC ..... H04L 63/20; H04L 67/10; H04L 63/0272; H04L 63/0263; H04L 41/20; H04L 63/0876; H04L 63/1408; H04L 63/1433; H04L 63/1425; H04L 63/108; H04L 63/105; H04L 21/443; H04L 21/4437; H04W 12/0802
See application file for complete search history.

(56) References Cited

U.S. PATENT DOCUMENTS

| 5,469,367 | A | 11/1995 | Puri et al. |
| 6,125,447 | A * | 9/2000 | Gong ...................... G06F 9/468 713/154 |
| 9,325,739 | B1 * | 4/2016 | Roth ....................... H04L 63/20 |
| 2006/0230432 | A1 * | 10/2006 | Lee ........................ G06F 16/958 726/1 |
| 2007/0156691 | A1 | 7/2007 | Sturms et al. |

(Continued)

OTHER PUBLICATIONS

Turkmen F., Analysis of XACML Policies with SMT, Principles of Security and Trust, 2015, Lecture Notes in Computer Science, vol. 9036. Springer, Berlin, Heidelberg, section 2.2, p. 118, available at https://pdfs.semanticscholar.org (Year: 2015).*

(Continued)

*Primary Examiner* — Theodore C Parsons
*Assistant Examiner* — Howard H. Louie
(74) *Attorney, Agent, or Firm* — Davis Wright Tremaine LLP

(57) ABSTRACT

Requests of a computing system may be monitored. A request associated with the application of a policy may be identified and a policy verification routine may be invoked. The policy verification routine may detect whether the policy of the request is more permissive than a reference policy and perform a mitigation routine in response to determining that the policy of the request is more permissive than the reference policy. Propositional logics may be utilized in the evaluation of policies.

21 Claims, 16 Drawing Sheets

(56) References Cited

U.S. PATENT DOCUMENTS

| | | | |
|---|---|---|---|
| 2008/0046960 A1* | 2/2008 | Bade | G06F 9/4856 |
| | | | 726/1 |
| 2009/0070853 A1* | 3/2009 | Chung | G06F 21/604 |
| | | | 726/1 |
| 2010/0064341 A1* | 3/2010 | Aldera | H04L 63/102 |
| | | | 726/1 |
| 2012/0017260 A1 | 1/2012 | Narain et al. | |
| 2013/0086184 A1 | 4/2013 | Kavantzas et al. | |
| 2013/0312058 A1* | 11/2013 | Thompson | G06F 21/54 |
| | | | 726/1 |
| 2014/0013400 A1 | 1/2014 | Warshavsky et al. | |
| 2014/0359695 A1* | 12/2014 | Chari | H04L 63/20 |
| | | | 726/1 |
| 2015/0082370 A1* | 3/2015 | Jayaraman | H04L 63/20 |
| | | | 726/1 |
| 2015/0082441 A1* | 3/2015 | Gathala | G06F 9/541 |
| | | | 726/25 |
| 2016/0212167 A1* | 7/2016 | Dotan | H04L 63/20 |

OTHER PUBLICATIONS

Clark Barrett, SMT Solvers: Theory and Practice, Sep. 17, 2008, section 4.3, available at https://resources.mpi-inf.mpg.de/departments/rg1/conferences/vtsa08/slides/barret2_smt.pdf. (Year: 2008).*

Joseph Y. Halpern et al, Using First-Order Logic to Reason about Policies, ACM Transactions on Information and System Security (TISSEC), vol. 11 Issue 4, Jul. 2008 Article No. 21 (Year: 2008).*

International Search Report and Written Opinion dated Aug. 23, 2018, International Patent Application No. PCT/US2018/037947, filed Jun. 15, 2018.

Kolovski et al., "Analyzing Web Access Control Policies," 16th International World Wide Web Confrence, Association for Computing Machinery U.S., May 8-12, 2007, pp. 677-686.

Hughes et al., "Automated verification of access control policies using a SAT solver," International Journal on Software Tools for Technology Transfer, Oct. 21, 2008, 10(6): 503-520.

Pretschner et al., "Model-Based Tests for Access Control Policies," 2008 International Conference on Software Testing, Verification, and Validation, IEEE, Apr. 9, 2008, pp. 338-347.

International Search Report and Written Opinion dated Aug. 28, 2018, International Patent Application No. PCT/US2018/037948, filed Jun. 15, 2018.

Wikipedia, "Satisfiability modulo theories," May 27, 2016, retrieved Feb. 12, 2019, from https://en.wikipedia.org/w/index.php?title=Satisfiability_modulo_theories&oldid=722366638, 9 pages.

Barrett et al., "The SMT-LIB Standard Version 2.0," Dec. 21, 2010, retrieved Jun. 17, 2019, from http://smtlib.cs.uiowa.edu/papers/smt-lib-reference-v2.0-r10.12.21.pdf, 85 pages.

Barrett et al., "The SMT-LIB Standard Version 2.5," Jun. 28, 2015, retrieved Jun. 17, 2019, from http://smtlib.cs.uiowa.edu/papers/smt-lib-reference-v2.5-r2015-06-28.pdf, 85 pages.

Ranise et al., "The SMT-LIB Standard: Version 1.0 Working Draft," Jul. 26, 2004, retrieved Jun. 17, 2019, from http://smtlib.cs.uiowa.edu/papers/format-v1.0-r04.07.26.pdf, 33 pages.

Ranise et al., "The SMT-LIB Standard: Version 1.2," Aug. 5, 2006, retrieved Jun. 17, 2019, from http://smtlib.cs.uiowa.edu/papers/format-v1.2-r06.08.05.pdf, 43 pages.

* cited by examiner

SECURITY POLICY MONITORING SERVICE

CROSS-REFERENCE TO RELATED APPLICATIONS

This application is related to and incorporates by reference for all purposes the full disclosure of co-pending U.S. patent application Ser. No. 15/637,227, entitled "SECURITY POLICY ANALYZER SERVICE AND SATISFAIBILITY ENGINE," filed concurrently herewith.

BACKGROUND

The security of computing resources and associated data is of high importance in many contexts. As an example, networks of computing devices may be utilized to provide a robust set of services to their users. Within a network, a first user may be privileged with certain access rights and a second user may have a second set of access rights which may be different from the first user's access rights. Access rights of users in the context of a computing resource service provider may be defined using security policies, which may be utilized by the service provider as part of determining whether to grant or deny a user access to a computing resource.

Managing and maintaining the security of computer systems and computer networks is often complex and challenging. In many cases, the access rights of users in a system may change over time, which may, in some cases, necessitate a change in the security policies that apply to a user. As the number and types of users that are supported in a computer system or computer network expands, it may become difficult to determine whether the access rights associated with a user actually grants access to resources for which a user should have access to and denies access to resources for which a user should not have access to.

BRIEF DESCRIPTION OF THE DRAWINGS

Various techniques will be described with reference to the drawings, in which.

DETAILED DESCRIPTION

Figure 1:
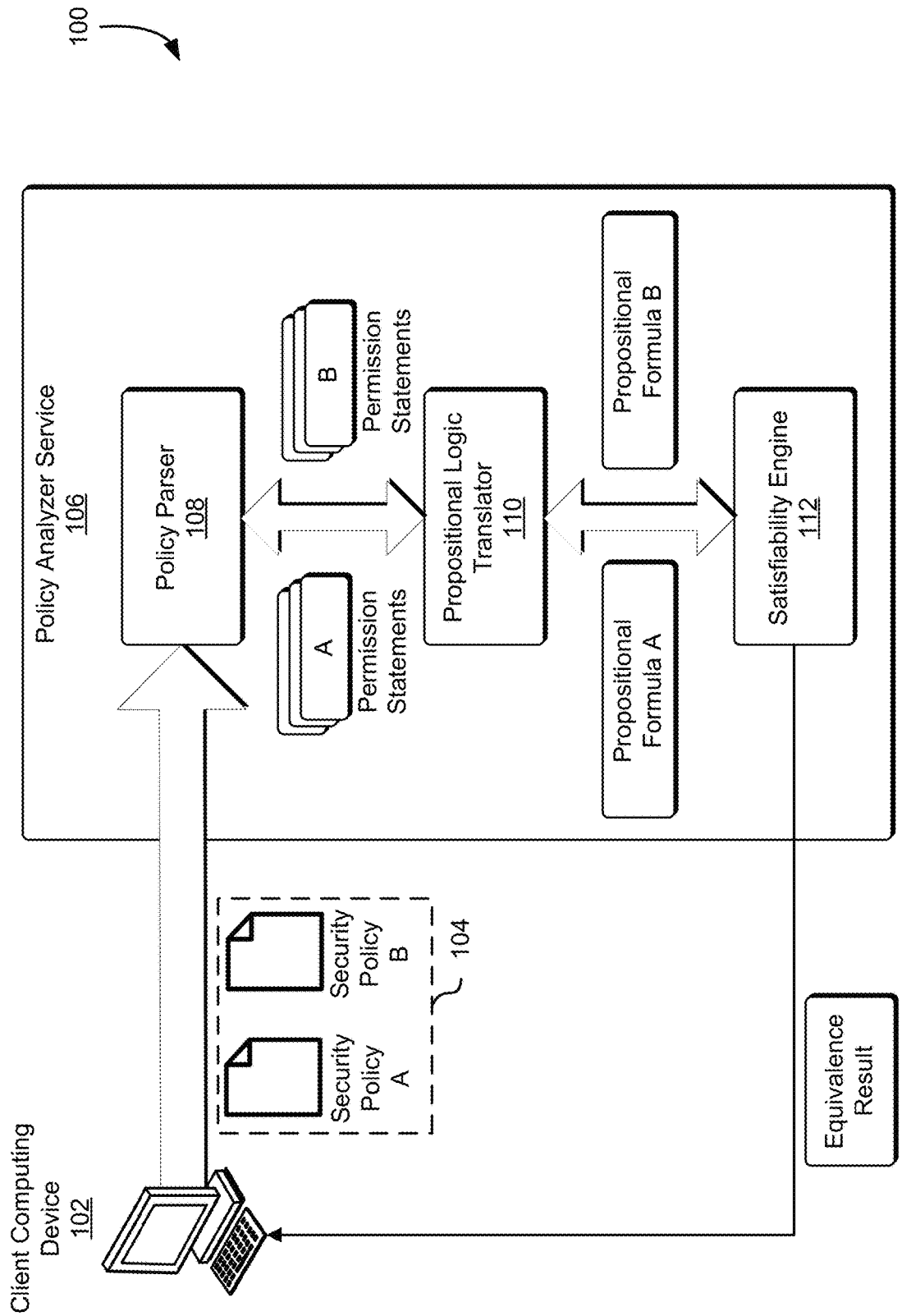
FIG. 1 illustrates an environment in which various embodiments can be implemented.

In the context of a computing resource service provider, clients may make requests to access resources of the computing resource service provider. A client may have a security policy associated with the client such that the security policy may be utilized as part of determining whether to grant the client access to one or more computing resources, such as computing resources that the client may request via application programming interface (API) calls which may be routed over a network to the service provider. In some cases, the computing resource service provider may provide users the ability to create, change, or delete security policies or portions of security policies. A security policy analyzer service may be utilized to compare security policies and determine whether a first security policy is more permissive than a second security policy.

In various examples, a client may request a policy analyzer service to analyze security policies to determine the relative permissiveness of the policies—in other words, the policy analyzer may be used to determine whether two security policies are equivalent, whether a first security policy is more permissive than a second security policy, and more. The policy analyzer service may be a service of a computing resource service such as those described elsewhere in this disclosure, and may be accessible via API calls which may be routed over a network to a service provider. A client computing device may be operable to access services, computing resources, etc., of a computing resource service provider. In various examples, the client computing device communicates with a policy analyzer service via web API calls.

A client computing device, on behalf of a client, may utilize a policy analyzer service to determine the equivalency of two or more security policies. The client may, using a client computing device, make an API request to the policy analyzer service that includes two or more security policies. Generally speaking, a security policy may be information that specifies one or more security permissions. Security permissions may be elements of the security policy that define access rights associated with resources and/or principals of a system. For example, a permission may be used to grant or deny access to computing resources of a computing resource service provider. In some cases, a permission may specify a principal, a computing resource, an action, a condition, and an effect. In some embodiments, a permission may also specify a plurality of one or more of these elements such as, for example, a set or class of users, a collection of resources, several different actions, and/or multiple conditions.

A security policy may include one or more permission statements as well as additional information such as versioning information and policy-wide information. A security policy may include a set of conditions that can be utilized to determine whether to grant access or deny access to computing resources in various contexts, such as in the context of different users, different actions being performed on the computing resources, and different conditions of access. An authorization module or authorization service, such as those described elsewhere in this disclosure, may be utilized to evaluate whether to grant or deny a request to access resources based at least in part on evaluating a security policy in connection with the request. In some cases, policy-wide information is included in a policy header at the beginning of a policy or may even be stored separately from (and in association with) a policy document. A policy may include multiple policy statements, such as those described elsewhere in connection with FIG. 2.

As described throughout this disclosure, a policy analyzer service may be a service of a computing resource service provider and may support one or more APIs that a client may utilize to submit requests to the policy analyzer service to evaluate security policies, such as an API to determine whether a first security policy is more permissive than a second security policy and whether two or more security policies are equivalent. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable.

An API call supported by the policy analyzer service may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service may include multiple components and/or modules such as a policy parser; a propositional logic translator; and a satisfiability engine. The policy parser may be a component or module that receives a security policy and obtains one or more permission statements from the policy. For example, if the client provides a first policy "A" and a second policy "B," the policy parser may obtain a first set of permission statements from policy "A" and a second set of permission statements from policy "B." The permission statements may each be associated with the granting or denying access to computing resource. A propositional logic translator may convert permission statements into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions generated by the propositional logic translator may represent a set of constraints that must be satisfied for the corresponding permission statement to be in effect.

A satisfiability engine may be used to compare the first propositional logic expression and the second propositional logic expression to determine whether one propositional logic is more permissive than the other. A satisfiability engine may be used to analyze the permissiveness of two or more propositional logic expressions. The satisfiability engine may generate additional propositional logic constraints as part of determining whether the first propositional logic expression is more permissive than the second propositional logic expression. The constraints may be generated and evaluated in addition to constraints of the first propositional logic expression and the second propositional logic expression. The constraints may be generated based at least in part on what a client requests. For example, the satisfiability engine may generate constraints that are satisfied only under circumstances where a first policy grants access to a resource and a second policy denies access to the resource or is neutral regarding the resource in response to a request from a caller to determine whether a first propositional logic expression is more permissive than a second propositional logic expression. The satisfiability engine may be used to verify whether the propositional logic constraints (e.g., those obtained from the first and second propositional logic expressions and those generated by the satisfiability engine. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a SMT solver such as Z3, as described in https://github.com/Z3Prover/z3.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, the environment 100 includes: a client computing device 102; security policies 104; a policy analyzer service 106; a policy parser 108; a propositional logic translator 110; and a satisfiability engine 112. The environment 100 illustrates an example in which a client may request a policy analyzer service 104 to analyze security policies 104 to determine the relative permissiveness of the policies—in other words, the policy analyzer may be used to determine whether the security policies 104 are equivalent, whether a first security policy (e.g., Security Policy A shown in FIG. 1) is more permissive than a second security policy (e.g., Security Policy B shown in FIG. 1), and more.

The client computing device 102 may be a client of a service that provides access to computing resources. In some embodiments, the computing resources are accessed via application programming interface (API) calls which may be routed over a network to a service provider. The client computing device 102 may be an entity operable to access services, computing resources, etc., of a computing environment. In some embodiments, the client computing device 102 may communicate with a policy analyzer service 106 via web API calls.

In some embodiments, the client 102 utilizes a policy analyzer service 106 to determine the equivalency of two or more security policies 104. The client may make an API request to the policy analyzer service that includes two or more security policies 104. A security policy may be information (e.g., encoded in a file) that specifies one or more security permissions. Security permissions may be elements of the security policy that define access rights associated with resources and/or principals of a system. For example, a permission may be used to grant or deny access to computing resources of a computing resource service provider. Policies may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a policy or may even be stored separately from (and in association with) a policy document. A policy may include multiple policy statements, such as those described elsewhere in connection with FIG. 2.

Figure 4:
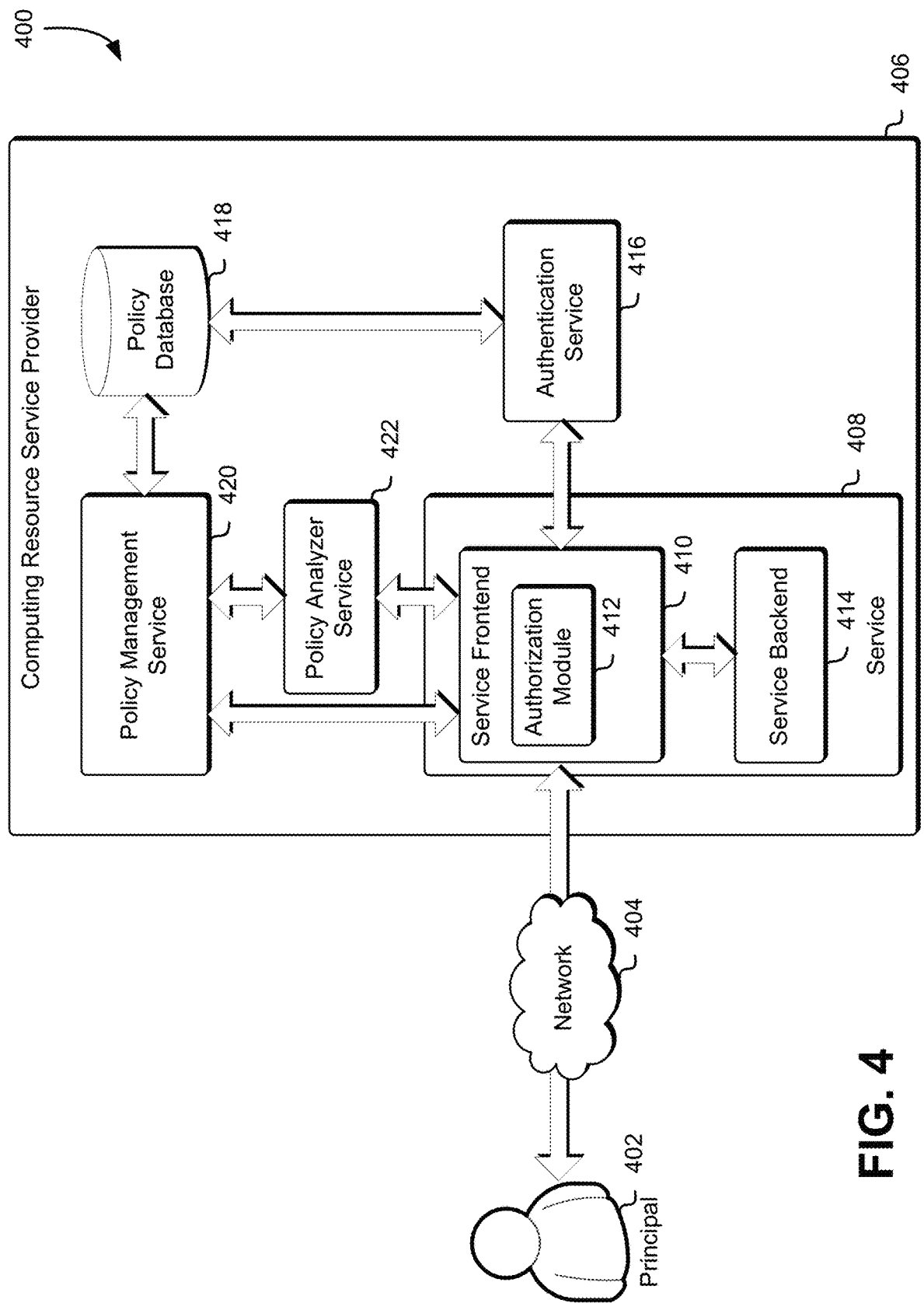
FIG. 4 illustrates an environment in which a distributed computer system may utilize the various techniques described herein.

The policy analyzer service 106 may be a service of a computing resource service provider (e.g., a computing resource service provider described elsewhere in connection with FIG. 4). The policy analyzer service 106 may be implemented using hardware, software, and a combination thereof. In some cases, the policy analyzer service 106 supports one or more APIs that a client (e.g., the client computing device 102) may use to provide requests to the policy analyzer service 106. The policy analyzer service 106 may support one or more APIs that are used to evaluate security policies (e.g., the security policies 104 described in connection with FIG. 1), such as an API to determine whether a first security policy is more permissive than a second security policy and whether two or more security policies are equivalent.

In some embodiments, permissiveness is used to describe the grant of access to resources. For example, if a first policy grants access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both grant access to the same resources and deny (either implicitly or explicitly) access to the same resources. In some cases, equivalency may refer to two policies explicitly granting access to the same resources and explicitly denying access to the same resources—in other words, if a first policy explicitly denies access to a computing resource and a second policy implicitly denies access to a computing resource (e.g., by not affirmatively granting access in a deny-by-default context) may lack equivalency in some embodiments. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should be noted that unless otherwise specified, examples described herein may implement a deny-by-default security model in which access to a computing resource is denied unless there exists an explicit grant of access to the computing resource. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more. Such techniques may be performed in accordance with a computing resource service provider described elsewhere in connection with FIG. 4.

The policy analyzer service 106 may be used to determine the permissiveness of one or more policies. For example, an API call supported by the policy analyzer service 106 may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service 106 may include multiple components and/or modules such as a policy parser 108; a propositional logic translator 110; and a satisfiability engine 112. In some embodiments, the functions of various components and/or modules may be delegated to other services with which the policy analyzer service 106 may utilize. For example, the policy analyzer service 106 may, in some embodiments, utilize a different service for performing functionality related to parsing policies.

The policy parser 108 may be a component or module that receives a security policy (e.g., a security policy received from a client in connection with an API call or obtained via a policy management service) and obtains one or more permission statements from the policy. For example, if the client provides a first policy "A" and a second policy "B" to the policy analyzer service 104, the policy analyzer service 104 may use the policy parser 108 to obtain a first set of permission statement from policy "A" and a second set of permission statement from policy "B." The permission statements may each be associated with the granting or denying access to computing resource. The permission statements may be in a particular format such as JSON, Aspen, and more.

As described herein, propositional logic may refer to a symbolic logic that relates to the evaluation of propositions that may evaluate to either being true or false. Propositional logic may be utilized to evaluate the logical equivalence of propositional formulas. A propositional formula. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic—for example, in some embodiments, a first-order logic translator (not shown in FIG. 1) may be utilized in place of a propositional logic translator 110 to translate permission statements to first-order logic expressions and a satisfiability engine may evaluate one or more first-order logic expressions to determine whether the expressions are equivalent.

Permission statements (e.g., those obtained by the policy parser 108) may be provided to a propositional logic translator 110. A propositional logic translator 110 may receive a permission statement (e.g., in JSON format) and convert the permission statement into one or more constraints described using propositional logic. The constraints may be described in various formats and in accordance with various standards such as SMT-LIB standard formats, CVC language, and Center for Discrete Mathematics and Theoretical Computer Science (DIMACS) formats.

For example, a permission statement (e.g., a permission statement included as part of a security policy) may be described as:

```
"Statement": [
{
    "Effect": "Allow",
    "Resource": *,
    "Principal": *,
    "Action": "put*"
} ]
```

The corresponding propositional logic constraints may be generated from the example policy statement may be described as:

```
(assert policy.statement.resource)
(assert policy.statement.principal)
(assert (= policy.statement.action (or (and (= "storage" actionNamespace) (str.prefixof "put" actionName)))))
(assert (= policy.statement.effect.allows (and policy.statement.action policy.statement.resource policy.statement.principal)))
(assert (not policy.statement.effect.denies))
(assert (= policy.allows (and (not policy.denies) policy.statement.effect.allows)))
(assert (= policy.denies policy.statement.effect.denies))
```

The propositional logic expressions generated by the propositional logic translator 110 may represent a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled.

In some embodiments, the client computing device 102 transmits (e.g., on behalf of a client end-user) a web API request to the policy analyzer service 106 requesting that the policy analyzer service 106 determine whether a first security policy (e.g., "Security Policy A" illustrated in FIG. 1) is more permissive than the second security policy (e.g., "Security Policy B"). The security policies 104 may be encoded in the web API request or information usable to obtain the security policies (e.g., a pointer or a URI indicating the location where a policy may be obtained) may be provided. The policy analyzer service 106 may obtain the security policies 104 (e.g., either directly from the request or via a policy management service using a URI encoded in the request) and utilize a policy parser 108 to obtain a first set of permission statements from the first policy and a second set of permission statement from the second policy. The policy statements may be provided to a propositional logic translator 110 to obtain a set of propositional logic expressions that correspond to constraints that must be satisfied for the corresponding policy statement to be in effect. A first propositional logic expression may be generated from the first set of policy statements and a second propositional logic expression may be generated from the second set of policy statements. The propositional logic expressions may be expressed in a language in accordance with a SMT-LIB standard language such as the STM-LIB 2.0 standard. A satisfiability engine 112 may be used to compare the first propositional logic expression and the second propositional logic expression to determine whether one propositional logic is more permissive than the other.

A satisfiability engine 112 may be used to analyze the permissiveness of two or more propositional logic expressions. The satisfiability engine 112 may be hardware, software, or a combination thereof. In some embodiments, the satisfiability engine 112 allows clients (e.g., internal clients such as the propositional logic translator 110, the policy analyzer service 106, etc.) to determine whether a first propositional logic expression is more permissive than a second propositional logic expression. The satisfiability engine 112 may generate additional propositional logic constraints as part of determining whether the first propositional logic expression is more permissive than the second propositional logic expression.

In some embodiments, the satisfiability engine 112 utilizes the following constraints to determine whether a first policy (e.g., policy A) is more permissive than a second policy (e.g., policy B):

---
(assert (or policyB.neutral policyB.denies))
(assert policyA.allows)
---

The constraints may be generated and evaluated in addition to constraints of the first propositional logic expression and the second propositional logic expression, which may be encoded in the manner described above in connection with the discussions of FIG. 1. The constraints may be generated based at least in part on what a client requests. For example, the satisfiability engine 112 may generate constraints that are satisfied only under circumstances where a first policy grants access to a resource and a second policy denies access to the resource or is neutral regarding the resource in response to a request from a caller (e.g., the policy analyzer service 106) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the satisfiability engine 112 may generate different constraints that are satisfied where the first policy grants access to a resource or is neutral regarding the resource and the second policy does not deny access to the resource.

The satisfiability engine 112 may be used to verify whether the propositional logic constraints (e.g., those obtained from the first and second propositional logic expressions and those generated by the satisfiability engine) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a satisfiability engine including but not limited to satisfiability (SAT) solvers and binary decision diagrams (BDD) solvers. The satisfiability engine 112 may generate an equivalence result that indicates whether the formula is satisfiable and, by extension, whether two or more policies are equivalent. In some embodiments, an equivalence result is made available to another computing entity, such as the client computing device 102 that issued a request, a system administrator, and other computing entities.

Figure 2:
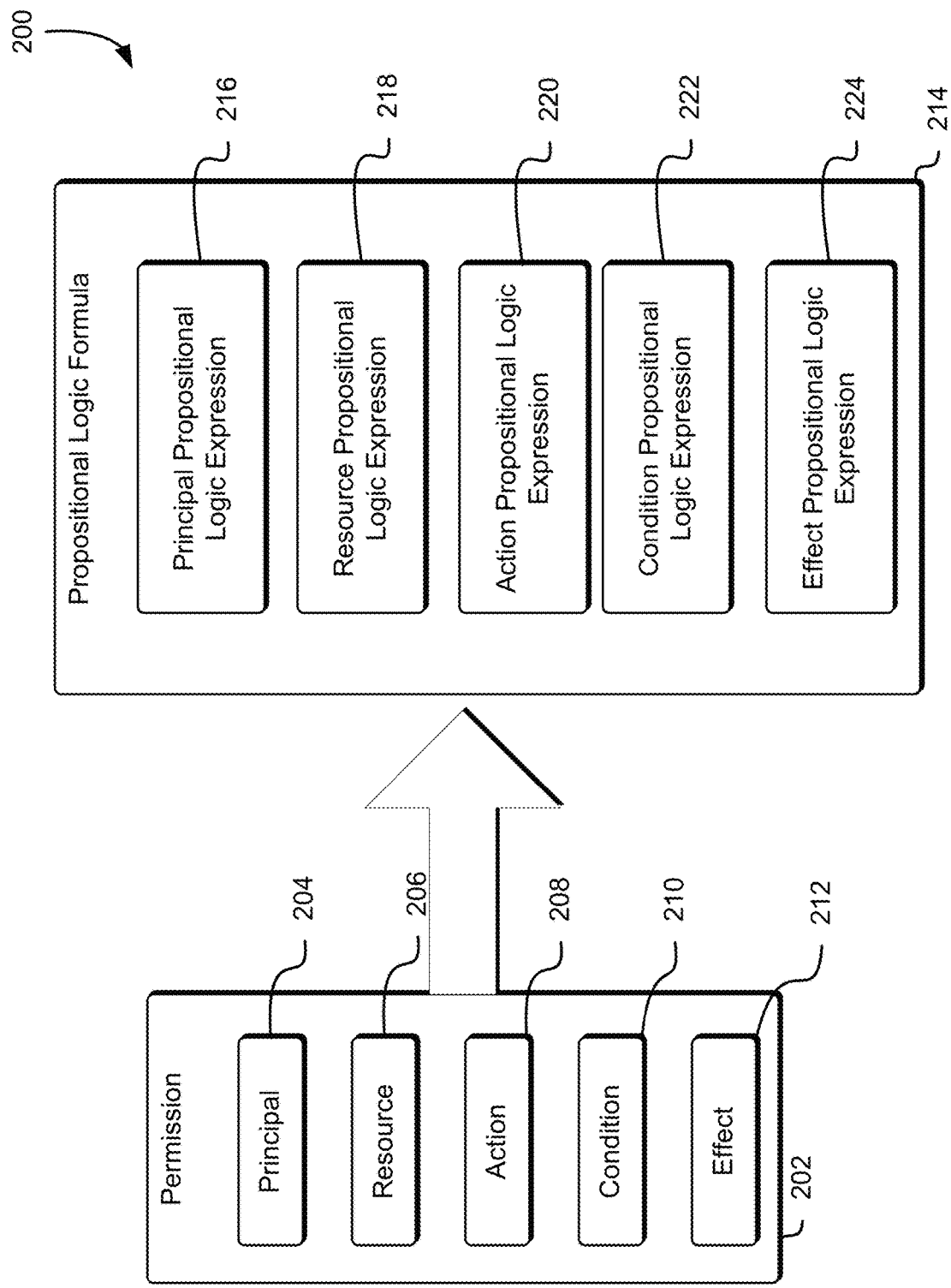
FIG. 2 illustrates an environment in which a computing resource service provider may be utilized to implement various embodiments.

FIG. 2 shows an illustrative example of a diagram 200 in which a security permission and a corresponding propositional logic expression are shown. The permission 202 illustrated in FIG. 2 may be one of a plurality of security permissions specified in a security policy, such as security policies described elsewhere in connection with FIG. 1.

Diagram 200 illustrates an example of a permission 202 which may be associated with a computing resource policy. In some embodiments, a permission 202 may specify a principal 204, a resource 206, an action 208, a condition 210, and an effect 212. In some embodiments, a permission 202 may also specify a plurality of one or more of these elements such as, for example, a set or class of users, a collection of resources, several different actions, and/or multiple conditions. In some embodiments, the permission 202 may specify one or more wildcard or otherwise modifiable characters that may be used to denote that the permission 202 may be modified to make the permission 202 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 204 may be a user, a group, an organization, a role, or a collection and/or combination of these or other such entities. A principal 204 may be any entity that is capable of submitting API calls that cause an action associated with a resource to be performed and/or any entity to which permissions associated with a resource may be granted. As an example, a permission 202 may have a principal 204 element specified in the following manner:

"Principal": "rn:ws:iam::ducksfan8"

In some embodiments, the principal 204 is identified by a resource name that uniquely identifies the principal 204. A principal 204 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be option; and "ducksfan8" may refer to an identifier for the account, such as the account that owns the resource 206 specified in the permission 202.

The resource 206 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 206 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 202 may have a resource 206 element specified in the following manner:

"Resource": "rn:ws:storage:::bucket/MM4_Heisman.png"

In some embodiments, the resource 206 is identified by a resource name that uniquely identifies the resource 204. In some cases, the resource 206 may share a same naming convention as the principal 204 or other elements of the permission. However, this need not be the case, as each separate element of a permission 202 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action 208 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 202 may have an action 208 element specified in the following manner:

"Action": "storage:GetObject"

In this example, the action that is allowed or denied (determined based on the effect 212 specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 210 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 208 element. As an example, a permission 202 may have a condition 210 element specified in the following manner:

"Condition": {"DateLessThan": {"ws:CurrentTime": "2014-12-13"}}

In this example, the condition, the "ws:CurrentTime" value of the request is compared against a literal value "2104-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys. Such an example is discussed below in connection with FIGS. 5-11. In some embodiments, such as those where conditions include quantifier, first-order logic may be utilized rather than propositional logic.

An effect 212 may refer to whether the permission 202 is used to grant or deny access to the computing resources specified in the permission 202 in the resource 206 element. An effect 212 may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission 202 may have an effect 212 element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/MM4_Heisman.png") when a specific condition is true (e.g., the API request is made prior to Dec. 13, 2016) may be specified in the following manner:

"Statement": [
{
"Effect": "ALLOW",
"Principal": "rn:ws:iam::ducksfan8",
"Action": "storage:GetObject",

```
    "Resource": "rn:ws:storage:::bucket/MM4_Heisman.png",
    "Condition": {
        "DateLessThan": {
            "ws:CurrentTime": "2014-12-13"
        }
    }
  }
 }
]
```

It should be noted that the examples described above merely described one of many ways in which permissions may be expressed. Of course, in other embodiments, variations on the principles described above in connection with FIG. 2 may be applied in various ways.

In some embodiments, elements may be described in inverse (e.g., negative) terms. An inverse element may be applied to all matches except for those specified in the element. For example, if a permission statement is described as "NotPrincipal: ducksfan8" then the permission statement applies to all principals except the particular principal or principals listed in the permission statement—in this case, the permission statement would apply to all principals except ducksfan8. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

As shown in FIG. 2, a permission 202 may be used to generate a propositional logic expression 214. A propositional logical expression 214 may comprise a set of logical expressions which represent the permission 202. Propositional logical expressions may be evaluated to determine whether a formula is satisfiable. For example, propositional logic may be used to determine whether it is satisfiable that a resource is allowed under a first propositional logical expression corresponding to a first security policy comprising a first set of permissions and the resource is not allowed (e.g., explicitly denied and/or not explicitly granted an ALLOW effect) under a second propositional logical expression corresponding to a second security policy comprising a second set of permissions. In some embodiments, the permission 202 statement may be used to generate a propositional logic expression 214. The principal 204 element may map to a principal propositional logic expression 216 which may comprise of statements in propositional logic and one or more assertions that are used as constraints on whether a formula is satisfiable. An example of this mapping is described below in connection with FIGS. 5-11. Likewise, the resource 206 element may map to a resource propositional logic expression 218, the action 208 element may map to an action propositional logic expression 220, the condition 210 element may map to a condition propositional logic expression 222, and the effect 212 element may map to an effect propositional logic expression 224. Various examples in connection with these mappings are described below in connection with FIGS. 5-11.

Figure 3:
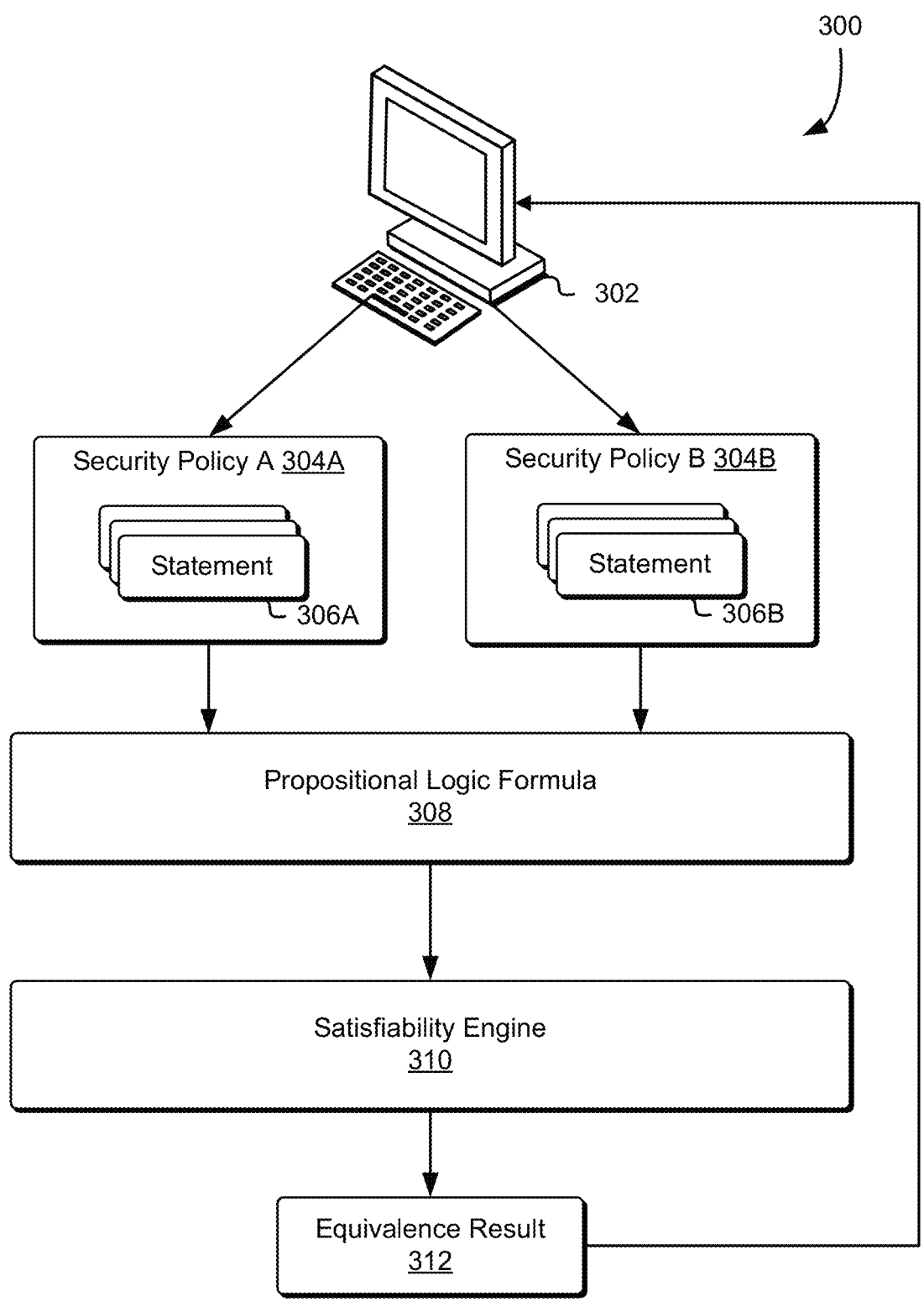
FIG. 3 illustrates an environment in which a client issue a request to analyze the equivalency of two security policies and receive an equivalence result.

FIG. 3 is an illustrative example of an environment 300 in which various embodiments of the present disclosure can be practiced. The environment 300 illustrates an example in which a client may issue a request to analyze the equivalency of two security policies and receive an equivalence result that indicates whether the policies are equivalent. The environment 300 may utilize components described elsewhere in this disclosure, such as components described in connection with FIGS. 1, 2, and 4.

In some embodiments, a client computing device 302 such as those described elsewhere in connection with FIG. 1 may issue a request on behalf of a client to determine the equivalency between two security policies. In some embodiments, the request is a web API request that encodes the security policies that are to be analyzed as part of the request. However, this need not be so—in some embodiments, the security client computing device may provide a reference to one or more security policies that the recipient of the request may use to obtain the one or more security policies. In some embodiments, a web API request is transmitted from the client computing device to a computing resource service provider in accordance with those described in connection with FIG. 4. The request may be fulfilled by a policy analyzer service, such as those described in connection with FIGS. 1 and 4. A first security policy 304A may be parsed to obtain one or more permission statements 306A and the permissions statements 306A may be translated to a first set of propositional logic expressions 308 which may act as constraints on a propositional logic formula. Likewise, a second security policy 304B may be parsed to obtain one or more permission statements 306B and the permissions statement 306B may be parsed to obtain a second set of propositional logic expressions 308 which may act as constraints. A system (e.g., a policy analyzer service or a component therein) may utilize a satisfiability engine 312, such as those described in connection with FIG. 1, to determine whether the two propositional logic expressions are equivalent, if one is more permissive than the other, and more.

The determination may be made in accordance with techniques described elsewhere in this disclosure. In some embodiments, an equivalence result 312 may indicate that two policies are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where another policy denies access.

In some embodiments, the equivalence result 312 may be transmitted to the client computing device 302 as a response to a web API request. In some embodiments, the equivalence result 312 may encode the permissiveness result (e.g., whether one policy was more permissive than a second policy). In some embodiments, other information is provided either in place of or in addition to the permissiveness result. For example, in the case where a first policy is more permissive than a second policy, the equivalence result 312 may encode a set of parameters that results in a grant of access by the first policy and a denial of access by the second policy (e.g., a principal, resource, and action may be encoded in the response such that a first policy will grant access to the principal to perform the action on the resource and the second policy will deny access to the principal from performing the action on the resource).

The environment 300 may be used to implement various embodiments. In some embodiments, a computing device may make a request to determine whether a policy (e.g., encoded in the request) complies with a set of minimum security standards. A computing resource service provider may receive the request, route, obtain a security policy associated with security standards, and determine the relative permissiveness of the provided policy and the security standard policy. If the provided policy is more permissive than the security standard, a response may indicate that the policy does not comply with the security standard. For example, in some embodiments, a client may attempt to set a security policy using a policy management service such as those described elsewhere in connection with FIG. 4. The policy management service may utilize a policy analyzer service to determine whether the client's security policy complies with one or more security standards. If the policy does not comply, then the policy management service may refuse to fulfill the request and indicate to the client that the request was not fulfilled and may encode that the security policy was more permissive than one or more security standard policies.

FIG. 4 is an illustrative example of an environment 400 in which a distributed computer system may utilize the various techniques described herein. In an embodiment, a principal 402 may use a computing device to communicate over a network 404 with a computing resource service provider 406. Communications between the computing resource service provider 406 and the principal 402 may, for instance, be for the purpose of accessing a service 408 operated by the computing resource service provider 406, which may be one of many services operated by the computing resource service provider 406. The service 408 may comprise a service frontend 410 and a service backend 414. The principal 402 may, through an associated computing device, issue a request for access to a service 408 (and/or a request for access to resources associated with the service 408) provided by a computing resource service provider 406. The request may be, for instance, a web service application programming interface request. The principal may be a user, or a group of users, or a role associated with a group of users, or a process representing one or more of these entities that may be running on one or more remote (relative to the computing resource service provider 406) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 402 may communicate with the computing resource service provider 406 via one or more connections (e.g., transmission control protocol (TCP) connections). The principal 402 may use a computer system client device to connect to the computing resource service provider 406. The client device may include any device that is capable of connecting with a computer system via a network, such as example devices discussed below. The network 404 may include, for example, the Internet or another network or combination of networks discussed below.

The computing resource service provider 406, through the service 408, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 408 may be received by a service frontend 410, which, in some examples, comprises a web server configured to receive such requests and to process them according to one or more policies associated with the service 408. The request for access to the service 408 may be a digitally signed request and, as a result, may be provided with a digital signature. In some embodiments, the web server employs techniques described herein synchronously with processing the requests. The service frontend 410 may then send the request and the digital signature for verification to an authentication service 416. The authentication service 416 may be a stand-alone service or may be part of a service provider or other entity. The authentication service 416, in an embodiment, is a computer system configured to perform operations involved in authentication of principals.

Upon successful authentication of a request, the authentication service 416 may then obtain policies applicable to the request. A policy may be applicable to the request by way of being associated with the principal 402, a resource to be accessed as part of fulfillment of the request, a group in which the principal 402 is a member, a role the principal 402 has assumed, and/or otherwise. To obtain policies applicable to the request, the authentication service 416 may transmit a query to a policy repository 418 managed by a policy management service 420. The query to the policy repository 418 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request).

A policy management service 420 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend 410 may receive a request for access to resources and may generate a query to the policy management service based at least in part on information specified by the request.

Having obtained any policies applicable to the request, the authentication service 416 may provide an authentication response and, if applicable, the obtained policies back to the service frontend 410. The authentication response may indicate whether the response was successfully authenticated. The service frontend 410 may then check whether the fulfillment of the request for access to the service 408 would comply with the obtained policies using an authorization module 412. Note that, in some embodiments, a policy may be configured such that, whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 412 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 412 is not able to match the request to a permission specified by the policy, the authorization module 412 may execute one or more default actions such as, for example, providing a message to the service frontend that causes the service frontend to deny the request, and causing the denied request to be logged in the policy management service 420. If the authorization matches the request to one or more permissions specified by the policy, the authorization module 412 may resolve this by selecting the least restrictive response (as defined by the policy) and by informing the service frontend whether the fulfillment of the request is authorized (i.e., complies with applicable policy) based on that selected response. The authorization module 412 may also by select the most restrictive response or may select some other such response and inform the service frontend whether the fulfillment of the request is authorized based on that selected response. Note that, while FIG. 4 shows the authorization module 412 as a component of the service frontend 410, in some embodiments, the authorization module 412 is a separate service provided by the computing resource service provider 406 and the frontend service may communicate with the authorization module 412 over a network.

Finally, if the fulfillment of the request for access to the service 408 complies with the applicable obtained policies, the service frontend 410 may fulfill the request using the service backend 414. A service backend 414 may be a component of the service configured to receive authorized requests from the service frontend 410 and configured to fulfill such requests. The service frontend 410 may, for instance, submit a request to the service backend to cause the service backend 414 to perform one or more operations involved in fulfilling the request. In some examples, the service backend 414 provides data back to the service frontend 410 that the service frontend provides in response to the request from the principal 402. In some embodiments, a response to the principal 402 may be provided from the service frontend 410 indicating whether the request was allowed or denied and, if allowed, one or more results of the request.

Figure 5:
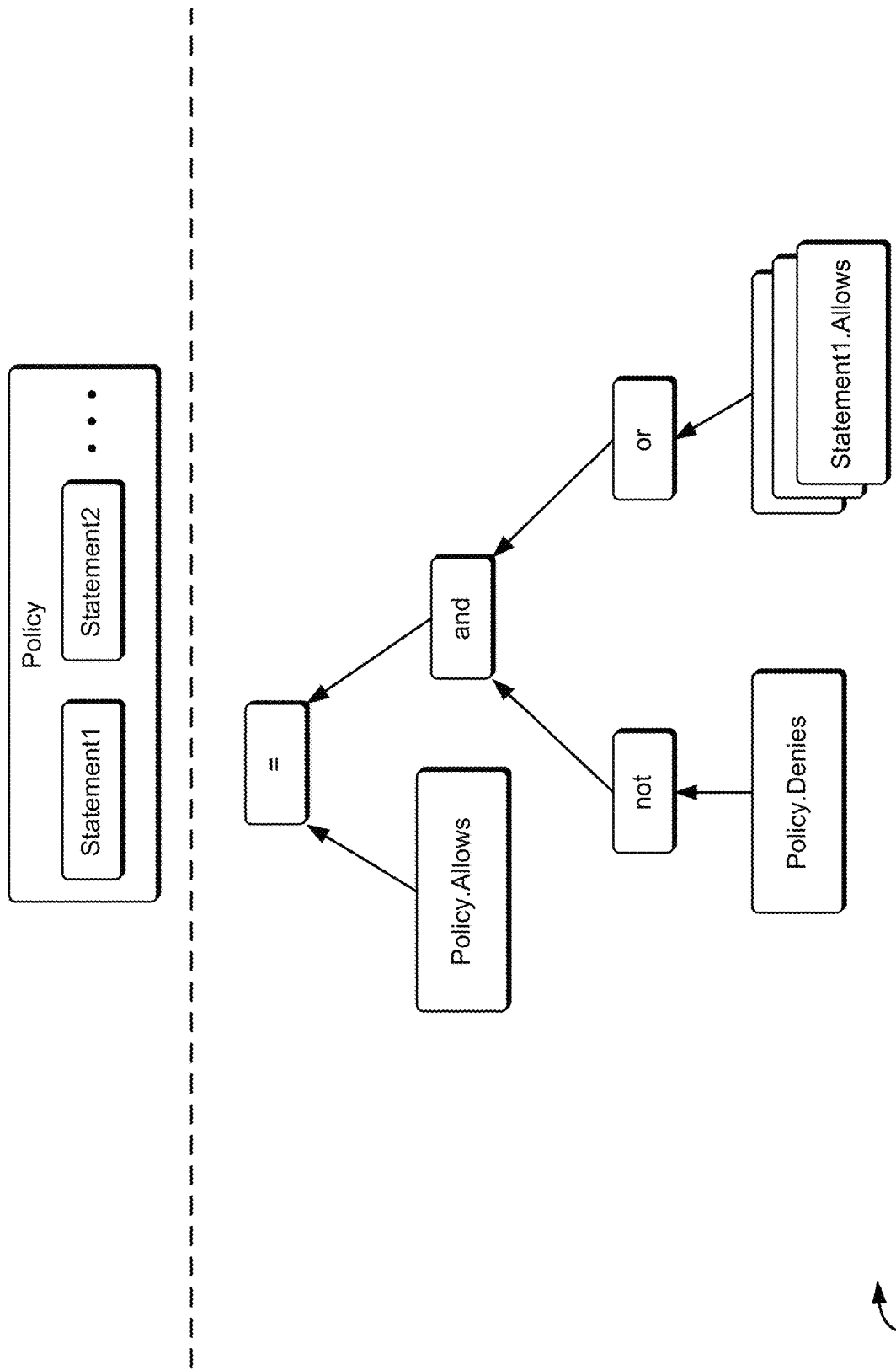
FIG. 5 illustrates a diagram in which propositional logic is used as part of determining satisfiability of a propositional logic formula.

FIG. 5 shows an illustrative example of a diagram 500 in which propositional logic is used as part of determining satisfiability of a propositional logic formula based at least in part on a policy. The diagram 500 illustrates an example policy which may be in accordance with those described elsewhere in this disclosure, such as in connection with FIGS. 1-4. The diagram 500 illustrates an aspect in which propositional logic (shown below the dotted lines) is used to determine whether the policy is satisfiable. The policy may include one or more policy statements that may be constraints on the propositional logic. An example policy statement (e.g., a permission statement) is described elsewhere in this disclosure in connection with FIG. 4.

The diagram 500 illustrates a propositional logic that may be used in part to determine whether the policy 502 is satisfiable. In the diagram 500, the propositional logic illustrates a constraint used in part to determine satisfiability of a policy. In particular, the diagram 500 illustrates a constraint that what the policy allows must be equivalent to what was not explicitly denied by the policy and is allowed by any of the one or more statements of the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats. The SMT-LIB standard: version 2.5, SMT-LIB standard version 2.0, SMT-LIB standard version 1.2, and SMT-LIB standard version 1.0 are hereby incorporated by reference.

For example, an implementation in accordance with STM-LIB standard v2.0 may include constraints as described above in the following form:

```
(assert (= policyA.allows (and (not policyA.denies) (or
policyA.statement0.allows policyA.statement1.allows
policyA.statement2.allows . . . ))))
```

It should be noted that, here and elsewhere, the examples are given to illustrate concepts for how to implement various embodiments in accordance with the teachings of this disclosure. For instance, in the example above, the ellipses are used to illustrate that a policy with more than two permission statements will have more constraints that are connected using OR statements. It should be noted that propositional logics may be expressed using Polish notation (i.e., prefix notation) in various embodiments such as those in accordance with various STM-LIB standards.

Figure 6:
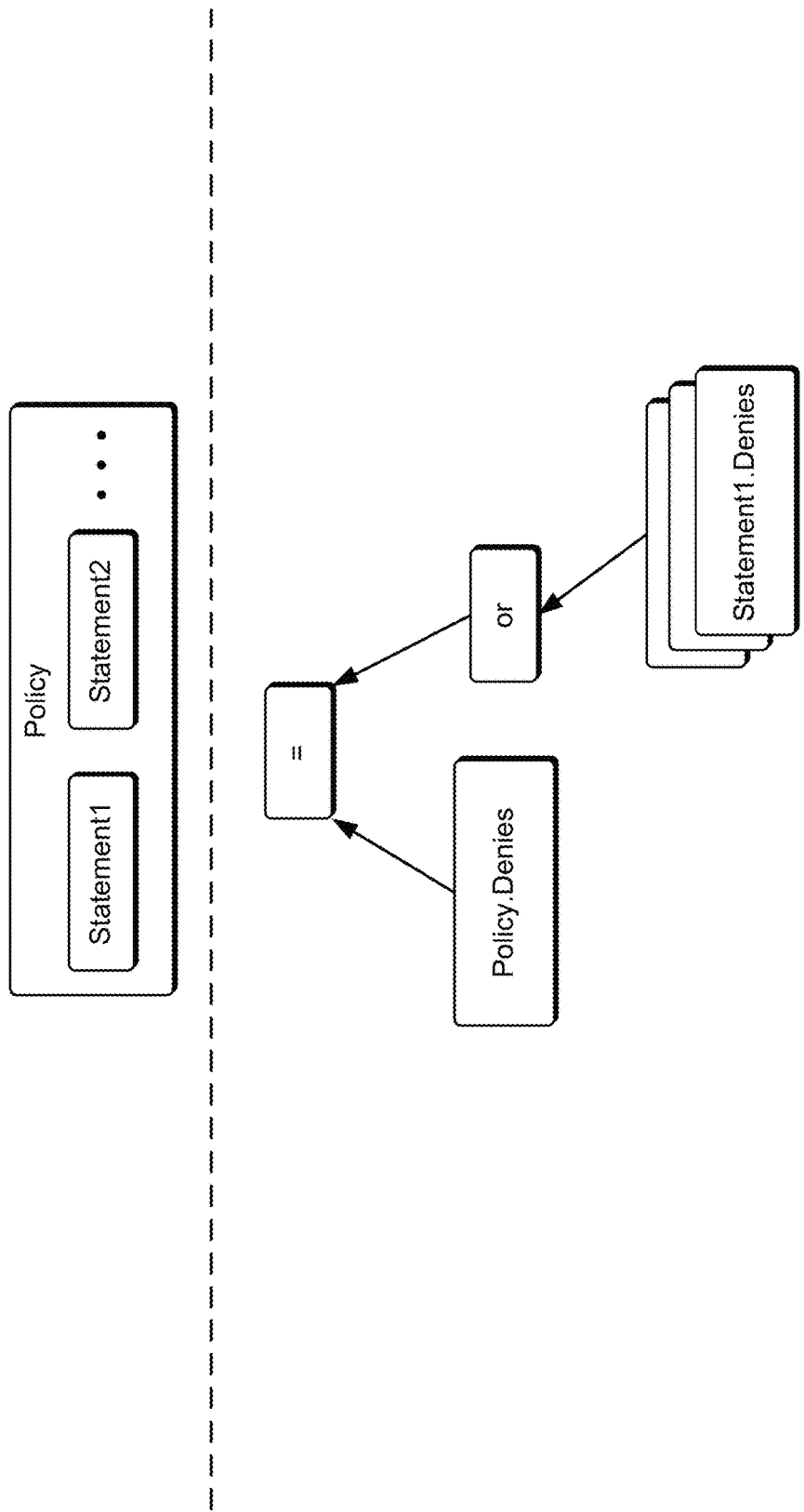
FIG. 6 illustrates a diagram in which propositional logic is used as part of determining satisfiability of a propositional logic formula.

FIG. 6 shows an illustrative example of a diagram 600 in which propositional logic is used as part of determining satisfiability of a propositional logic formula based at least in part on a policy. The diagram 600 illustrates an example policy which may be in accordance with those described elsewhere in this disclosure, such as in connection with FIGS. 1-5. The diagram 600 illustrates an aspect in which propositional logic (shown below the dotted lines) is used to determine whether the policy is satisfiable. The policy may include one or more policy statements that may be constraints on the propositional logic An example policy statement (e.g., a permission statement) is described elsewhere in this disclosure in connection with FIG. 2.

The diagram 600 illustrates a propositional logic that may be used in part to determining satisfiability of a propositional logic formula based at least in part on a policy. In the diagram 600, the propositional logic illustrates a constraint used in part to determine satisfiability of a policy. In particular, the diagram 600 illustrates a constraint that what the policy denies must be equivalent to what is denied by any of the one or more statements of the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats.

For example, an implementation in accordance with STM-LIB standard v2.0 may include constraints as described above in the following form:

```
(assert (= policyA.denies (or policyA.statement0.denies
    policyA.statement1.denies policyA.statement2.denies . . . )))
```

In other words, constraint provided by the example above is such that what a policy (e.g., policyA) denies is equivalent to what any individual statement (e.g., statement1, statement2, statement3, and so on) denies.

Figure 7:
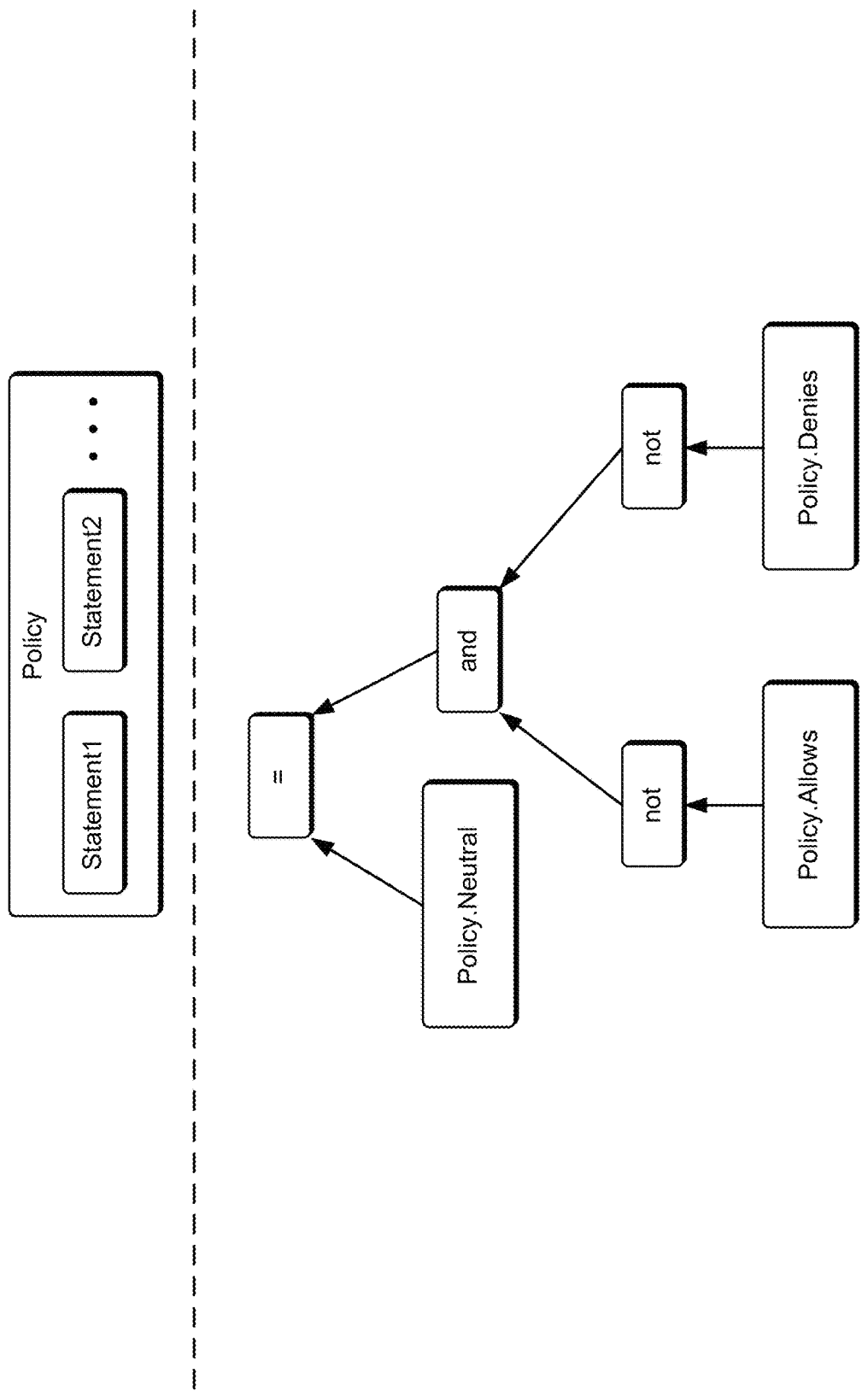
FIG. 7 illustrates a diagram in which propositional logic is used as part of determining satisfiability of a propositional logic formula.

FIG. 7 shows an illustrative example of a diagram 700 in which propositional logic is used as part of determining satisfiability of a propositional logic formula based at least in part on a policy. The diagram 700 illustrates an example policy which may be in accordance with those described elsewhere in this disclosure, such as in connection with FIGS. 1-6. The diagram 700 illustrates an aspect in which propositional logic (shown below the dotted lines) is used to determine whether the policy is satisfiable. The policy may include one or more policy statements that may be constraints on the propositional logic An example policy statement (e.g., a permission statement) is described elsewhere in this disclosure in connection with FIG. 2.

The diagram 700 illustrates a propositional logic that may be used in part to determining satisfiability of a propositional logic formula based at least in part on a policy. In the diagram 700, the propositional logic illustrates a constraint used in part to determine satisfiability of a policy. In particular, the diagram 700 illustrates a constraint that what the policy is neutral towards must be equivalent to what is not allowed by the policy and what is not denied by the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats.

For example, an implementation in accordance with STM-LIB standard v2.0 may include constraints as described above in the following form:

(assert (=p0.neutral (and (not p0.allows) (not p0.denies))))

In other words, constraint provided by the example above is such that what a policy (e.g., policyA) is neutral towards is equivalent to what was not allowed by the policy and what was not denied by the policy.

In connection with the discussion regarding FIGS. 5-7, the constraints described may be used in combination to define the constraints for a policy (e.g., policyA), which may be described in the following form:

```
"Statement": [
    {
        "Effect": "ALLOW",
        "Principal": "*",
        "Action": "*",
        "Resource": "*"
    }
]
```

Similarly, the constraints for a second policy (i.e., policyB) may be described in the following form:

```
"Statement": [
    {
        "Effect": "ALLOW",
        "Principal": "*",
        "Action": "sns:*",
        "Resource": "*"
    },
    {
        "Effect": "ALLOW",
        "Principal": "*",
        "NotAction": "sns:Delete",
        "Resource": "*"
    }
]
```

Accordingly, in addition to these constraints, additional constraints may be utilized to determine whether one policy is more permissive than another policy. For example, given two policies (e.g., policyA and policyB of the examples above), the following constraints may be used to determine whether a first policy (i.e., policyA) is more permissive than a second policy (i.e., policyB):

```
(assert (or pB.neutral pB.denies))
(assert pA.allows)
```

In various embodiments, a policy analyzer service may be utilized to determine that the above policies (policyA and policyB described above) are equivalent.

In some embodiments, such as those that implementing a deny-by-default system, an authorization module denies access to any resources of a computing resource service provider which a requestor (e.g., a principal) is not explicitly granted access to (e.g., via a permission statement affirmatively allowing access to the resource).

For example, an implementation in accordance with STM-LIB standard v2.0 may include constraints as described above in the following form:

(assert (=p0.neutral (and (not p0.allows) (not p0.denies))))

In other words, constraint provided by the example above is such that what a policy (e.g., policyA) is neutral towards is equivalent to what was not allowed by the policy and what was not denied by the policy.

Figure 8:
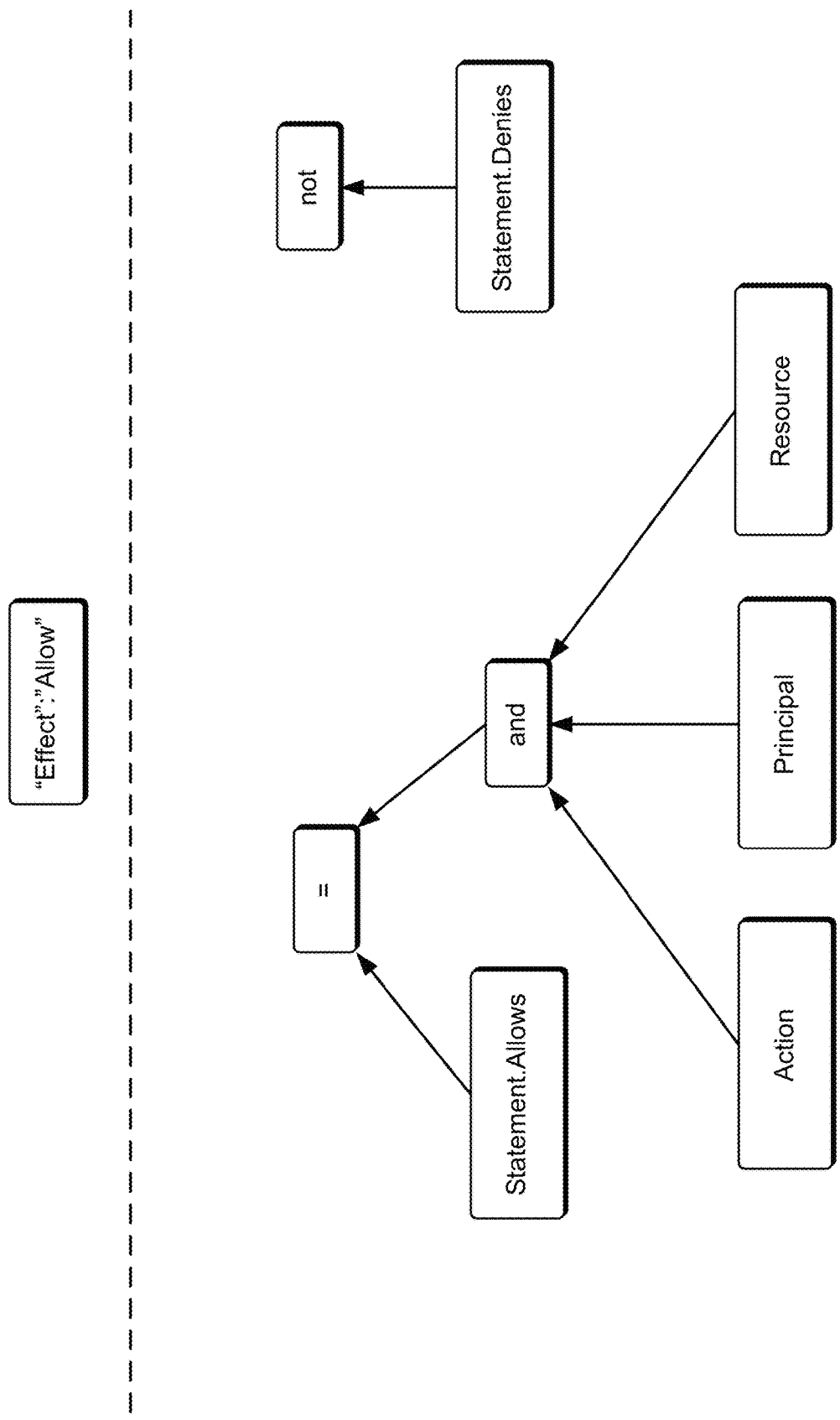
FIG. 8 illustrates a diagram in which propositional logic is used as part of determining satisfiability of a propositional logic formula.

FIG. 8 shows an illustrative example of a diagram 800 where an element (e.g., as part of a policy) is translated to a propositional logic. The translation may be performed by any suitable component, such as propositional logic translators discussed in connection with FIG. 1. The diagram 800 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an effect element of a permission statement that allows access to some resources (e.g., specified elsewhere in the permission statement) may be expressed as a propositional logic with the following constraints:

```
(assert (= policy.statement.allows (and policy.action policy.resource
policy.principal)))
(assert (not policy.statement.denies))
```

In other words, an allow effect generate propositional logic two constraints—a first constraint that the policy statement has an allow effect and that the action, resource, and principal constraints are satisfied; and a second constraint that the policy statement does not have a deny effect. The action, resource, and principal constraints may be in accordance with those described in connection with FIGS. 8-11. The constraints may also differ depending on what elements are included in the permission statement. For example, if a permission statement includes a condition, the constraint may further include that the condition be satisfied for the constraint to be satisfied. In some embodiments, at least one of the action, resource, and principal elements is a required element of the permission statement such that a valid policy statement must have at least one of the action, resource, and principal elements.

Figure 9:
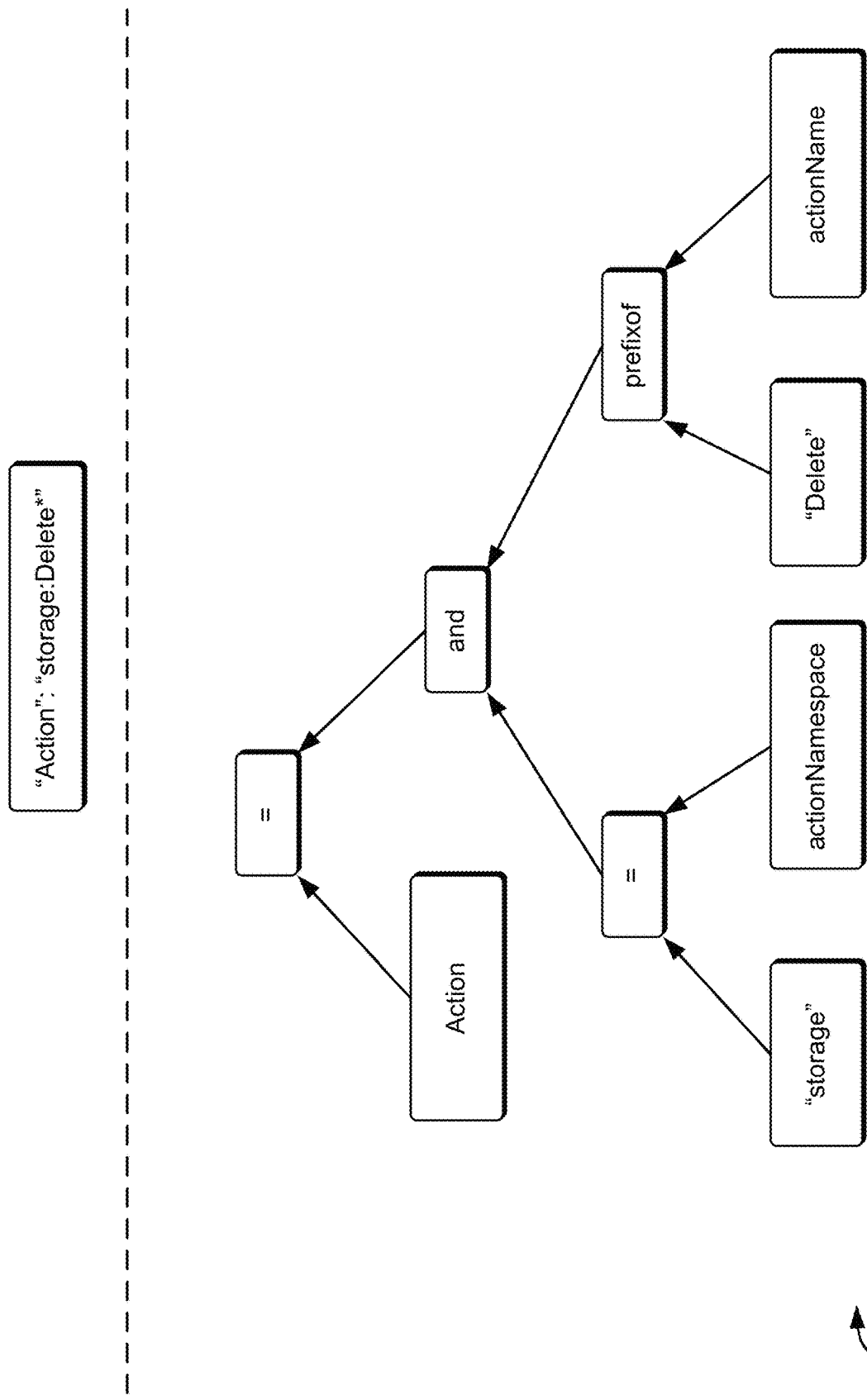
FIG. 9 illustrates a diagram in which propositional logic is used as part of determining satisfiability of a propositional logic formula.

FIG. 9 shows an illustrative example of a diagram 900 where an element (e.g., as part of a policy) is translated to a propositional logic. The translation may be performed by any suitable component, such as propositional logic translators discussed in connection with FIG. 1. The diagram 900 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an action element of a permission statement that grants or denies (depending on the effect element of the permission statement) access to some resources (e.g., specified elsewhere in the permission statement) may be expressed as a propositional logic with the following constraints:

```
(assert (= policy.action (or (and (= "storage" actionNamespace)
    (str.prefixof "Delete" actionName)))))
```

In other words, the action element above the dotted line in the diagram 900 may be translated to a propositional logic having a constraint that is satisfied when the action has a "storage" namespace and an action name that has a string prefix of "Delete" such as "DeleteObject" or "DeleteAllObjects" or "DeleteContainer" and so on. In some embodiments, various string evaluation functions may be used as part of a constraint, such as evaluating string prefixes, suffixes, lengths, substrings (e.g., whether a certain string is included as part of a second string), and so on. Comparison of strings may further include additional comparison parameters such as making case insensitive comparisons, ignoring symbols and punctuations, ignoring diacritics, ignoring differences between hiragana and katakana characters, and so on. The effect, action, resource, and principal constraints may be in accordance with those described in connection with FIGS. 8-11. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 10:
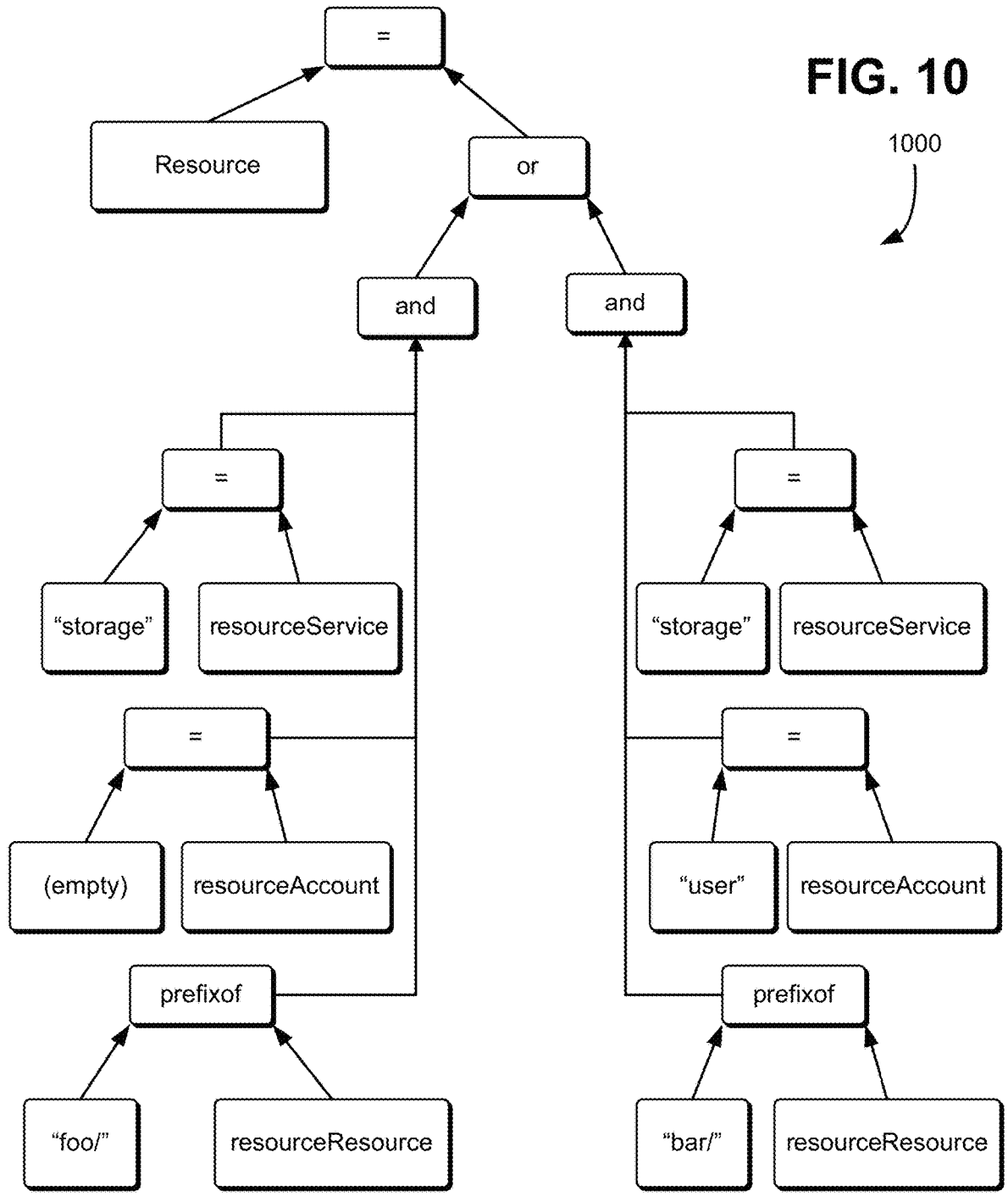
FIG. 10 illustrates a diagram in which propositional logic is used as part of determining satisfiability of a propositional logic formula.

FIG. 10 shows an illustrative example of a diagram 1000 where an element (e.g., as part of a policy) is translated to a propositional logic. The translation may be performed by any suitable component, such as propositional logic translators discussed in connection with FIG. 1. The diagram 1000 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, a resource element of a permission statement that grants or denies (depending on the effect element of the permission statement) access to a resources may be expressed as a propositional logic with the following constraints:

```
(assert (= policy.resource (or (and (= "storage" resourceService) (= ""
    resourceAccount) (str.prefixof "foo/" resourceResource)) (and (=
    "storage" resourceService) (= "user" resourceAccount) (str.prefixof
    "bar/" resourceResource)))))
```

In other words, the resource element above the dotted line in the diagram 900 may be translated to a propositional logic having a constraint that is satisfied when the resource has a "storage" service namespace, a blank resource account, and the resource beings with "foo/" or the resource has a "storage" service namespace, a "user" account, and the resource beings with "bar/" in some embodiments. The effect, action, resource, and principal constraints may be in accordance with those described in connection with FIGS. 8-11. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 11:
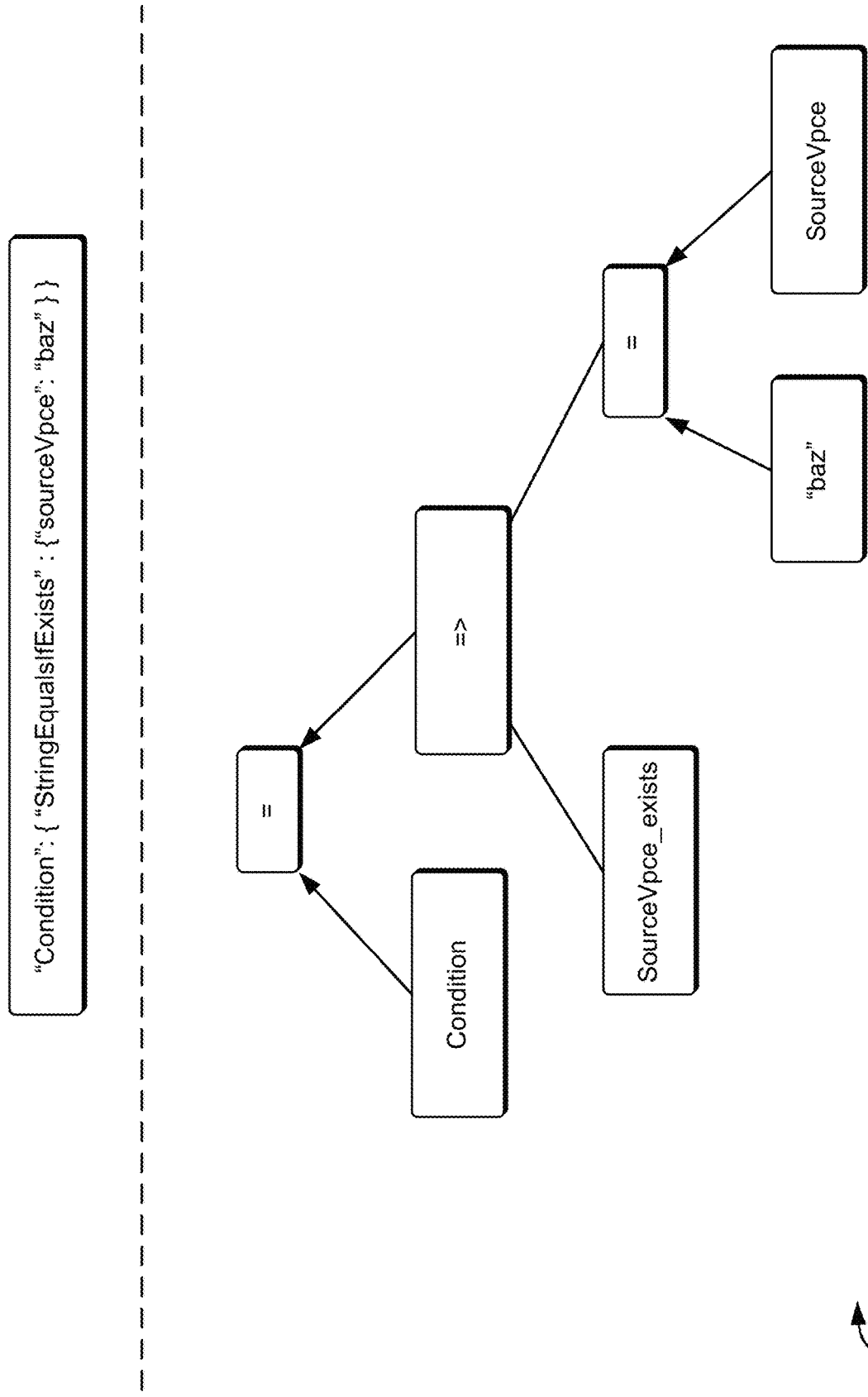
FIG. 11 illustrates a diagram in which propositional logic is used as part of determining satisfiability of a propositional logic formula.

FIG. 11 shows an illustrative example of a diagram 1100 where an element (e.g., as part of a policy) is translated to a propositional logic. The translation may be performed by any suitable component, such as propositional logic translators discussed in connection with FIG. 11. The diagram 1100 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an effect element of a permission statement that allows access to some resources (e.g., specified elsewhere in the permission statement) may be expressed as a propositional logic with the following constraints:
    (assert (=policy.condition (=>SourceVpce_exists|(="baz" SourceVpce))))

In other words, the resource element above the dotted line in the diagram 1100 may be translated to a propositional logic having a constraint that is satisfied when the "sourceVpce" condition key (e.g., a field that specifies the name of a source virtual PC instance) exists for a resource and has a value of "baz" on that resource. In some embodiments, an implication operator may be utilized as part of a constraint. In some embodiments, implication may be denoted by an operator such as "=>" shown in the diagram 1100 and may include a predicate that is evaluated if and only if the precondition is true. For example, consider the expression shown above the dotted line which reads in part:

StringEqualsIfExists": {"sourceVpce": "baz"}

This expression may be translated into a propositional logic constraint such that if and only if a precondition is true, that a predicate is evaluated. In the diagram 1100, the precondition may be that the "sourceVpce" condition key exists and the predicate may be that the value of "sourceVpce" condition key is equal to the string "baz" as described below the dotted line in the diagram 1100. For example, consider the case where the condition described in connection with FIG. 11 is included in a permission statement that applies to the resources described in connection with FIG. 10. In such cases, there may be some resources and/or types of resources in "foo/" and "bar/" that have the "sourceVpce" condition key and other resources and/or types of resources that do not have the condition key. In the cases where the resources or types of resources do not have the "sourceVpce" condition key, the predicate is not evaluated (or may be semantically treated as if the predicate was met). In some embodiments, if the "sourceVpce" field does not exist for a resource, the condition is not evaluated for that resource. The effect, action, resource, and principal constraints may be in accordance with those described in connection with FIGS. 8-11. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 12:
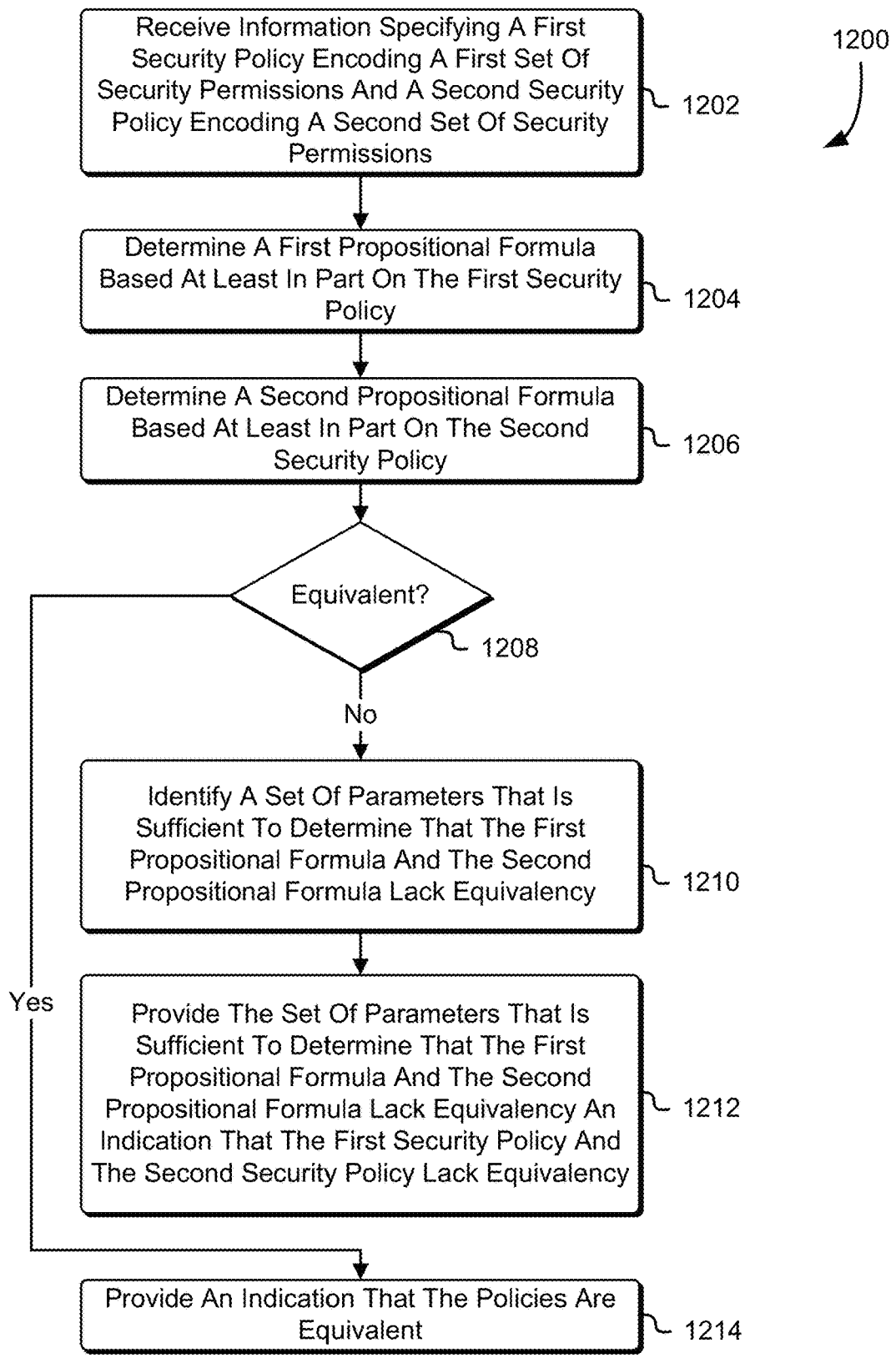
FIG. 12 shows a diagram illustrating a process for determining the equivalency of two or more security policies.

FIG. 12 shows an illustrative example of a process 1200 for determining the equivalency of two or more security policies. Generally, the process 1200 may be performed by any suitable system such as a policy analyzer service described elsewhere in this disclosure, such as those described in connection with FIG. 1. The process may be implemented using hardware, software, or a combination thereof. In an embodiment, the process 1200 includes receiving 1202 information specifying a first security policy and a second security policy. In some embodiments, the system receives the information as part of an interface, such as a web API request. In some embodiments, the security policies respectively encode a set of security permissions, which may be expressed in a language independent format such as JSON. The security permissions may be in accordance with those discussed elsewhere, such as in connection with FIG. 2. In some embodiments, the information specifying either or both policies may be specified directly (e.g., encoded as part of a data payload of a request) or indirectly (e.g., a reference to a policy is received by the system such that the reference may be used to obtain the policy, such as from a policy management service).

The system may determine 1204 a first propositional logic expression based at least in part on the first security policy. The determination may furthermore be made based on the first set of security permissions that is associated with the first security policy. The determination may be made in accordance with various embodiments described elsewhere in this disclosure. For example, the system may use a parser to obtain the first set of security permissions from the first security policy using a parse and may translate the first set of security permissions to a set of constraints in propositional logic, such as in the manner described above in connection with FIGS. 1-11. In some embodiments, the system translates a security policy expressed in JSON to a propositional logic expression (e.g., including one or more constraints) described in accordance with a SMT-LIB standard such as the SMT-LIB 2.0 standard.

The system may determine 1206 a second propositional logic expression in the same or substantially similar manner as described above in connection with determining 1204 the first propositional logic expression. However, in some embodiments, the steps may differ. For example, in some cases, the system may receive the first security policy directly in the request (e.g., the data encoding the policy may be included in the request) whereas the second security policy is indirectly referenced in the request (e.g., the request is a request to determine whether the first security policy complies with a standard security policy). In such an embodiment, the system may obtain the second security policy using the information included in the request that specifies the second security policy and then obtain the second propositional logic expression using the obtained second security policy. Techniques such as those described in connection with FIGS. 1-11 may be utilized.

The system may determine whether 1208 the first propositional logic expression and the second propositional logic expression are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where the another policy denies access.

A satisfiability engine may be used to analyze the permissiveness of two or more propositional logic expressions, which includes determining whether two propositional logic expressions are equivalent. The satisfiability engine may be used to verify whether the propositional logic constraints (e.g., those obtained from the first and second propositional logic expressions and those generated by the satisfiability engine) are equivalent. In some embodiments, determining whether two or more propositional logic expressions are equivalent may be implemented at least in part using a SMT solver such as Z3. More generally, techniques described herein for determining the permissiveness, relative permissiveness, and/or equivalency of propositional logic expressions and propositional logic constraints may be used in connection with determining whether 1208 the first propositional logic expression and the second propositional logic expression are equivalent.

In some embodiments, the process 1200 may include performing one or more translations so that the security policies are mapped to propositional logic expressions in a particular format recognized by a SMT solver. For example, if a Z3 solver is used in connection with determining equivalency, then the security policies may be mapped to a format in accordance with a SMT-LIB standard language such as the STM-LIB 2.0 standard.

If the system determines that the first propositional logic expression and the second propositional logic expression are equivalent, then the system may provide 1214 an indication that the policies are equivalent. In some embodiments, the indication may be encoded in response to a web API request.

However, if the system determines that the first propositional logic expression and the second propositional logic expression are not equivalent, then the system may identify 1210 a set of parameters that is sufficient to determine that the first propositional logic expression and the second propositional logic expression lack equivalency. The set of parameters may encode one or more resources, one or more principals, one or more actions, or some combination thereof. In some embodiments, the set of parameters may be used to demonstrate that the first security policy corresponding to the first propositional logic and the second security policy corresponding to the second propositional logic are not equivalent because the result of evaluating the first security policy using the set of parameters—in other words, whether the result is a grant of access or a denial of access—is different from the result of evaluating the second security policy using the same set of parameters. Said differently, for a particular set of parameters, it may be the case that the first security policy grants access based on those parameters and the second security policy denies access based on those same parameters, or vice versa. In some embodiments, the system may identify 1210 the set of parameters as part of determining whether 1208 the propositional logic expressions are equivalent. In some cases, the system may provide 1212 the set of parameters as part of a web API response as an indication that the security policies are not equivalent. In some embodiments, the set of parameters may not be provided, but instead, an indication (e.g., a return code) may indicate whether the policies are equivalent. For example, a Boolean value may be returned such that TRUE is returned if the security policies are equivalent and FALSE is returned if they are not equivalent. Alternatively, an integer value may be returned such that 0 is returned if the security policies are equivalent, −1 is returned if the first security policy is more permissive than the second security policy, and 1 is returned if the second security policy is more permissive than the first security policy.

The order of various steps shown in the process 1200 are merely illustrative, and it may be the case that the determining 1206 of the second propositional logic expression may occur either before and/or in parallel with the determining 1204 of the first propositional logic expression. In fact, the ordering may even be nondeterministic in some embodiments. For example, the determinations 1204 and 1206 may be farmed out to separate compute instances of a pool of compute instances which may be run in parallel and may have different computational performance characteristics.

Figure 13:
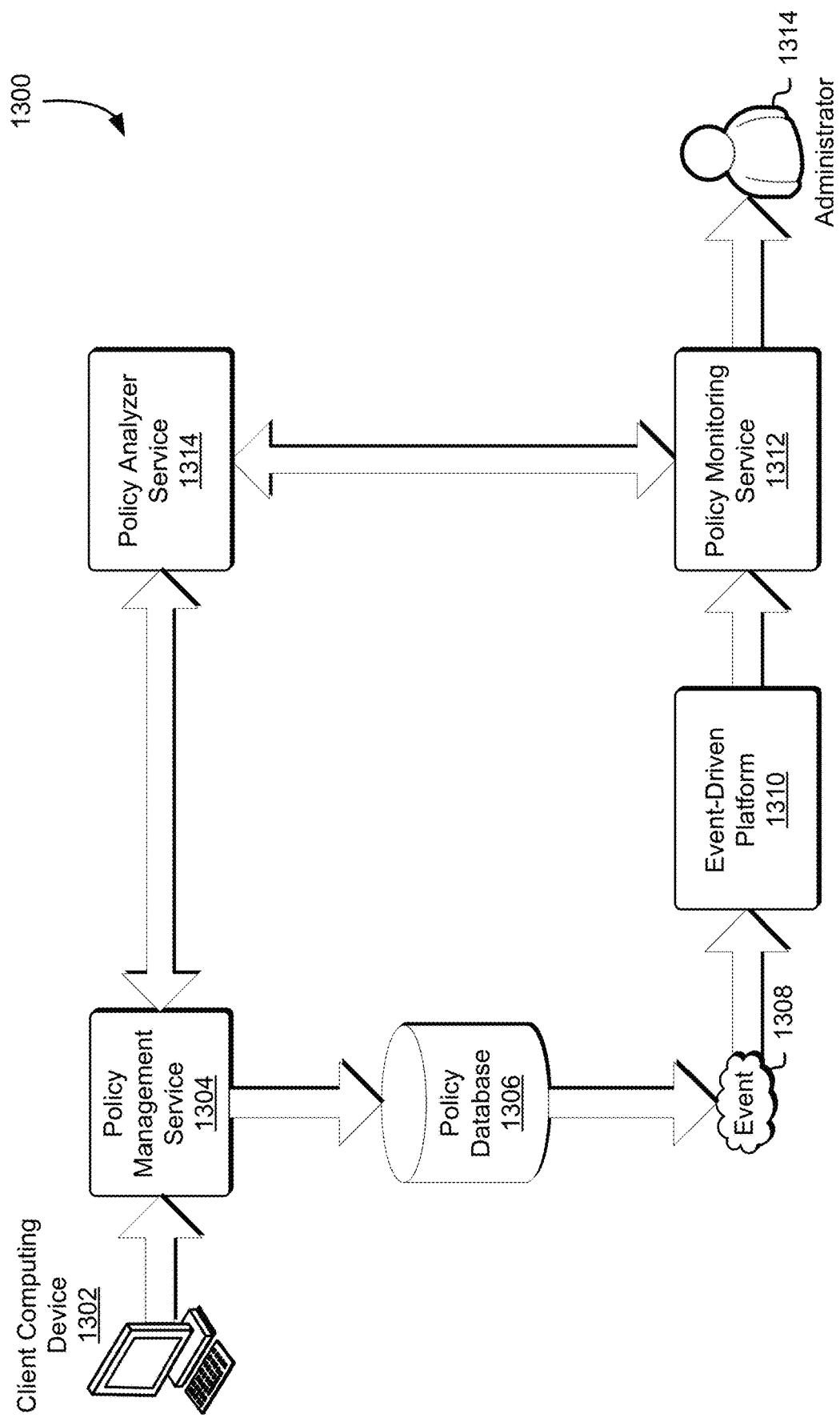
FIG. 13 illustrates an environment in which an event-driven platform is utilized in connection with analyzing security policies being applied to a system.

FIG. 13 is an illustrative example of an environment 1300 in which various embodiments of the present disclosure can be practiced. In an embodiment, the environment 1300 includes: a client computing device 1302; a policy management service 1304; a policy repository 1306; an event-driven platform 1310; a policy monitoring service 1312; and a policy analyzer service 1314. The environment 1300 illustrates an example in which a client may apply a policy which generates a corresponding event 1308 and the event 1308 in turn triggers the event-driven platform 1310 to analyze one or more policies. In some cases, such as where the client computer system applies or attempts to apply a security policy that does not conform to a set of rules, an administrator 1314 of a network may be notified, perhaps in addition to other actions such as refusing fulfill a request to apply the noncompliant policy, provide a warning to the client that a policy is noncompliant, or perform additional auditing steps.

In some embodiments, a computing resource service provider, such as those described in connection with FIG. 4, is configured so that clients of the computing resource service provider can apply security policies within an environment. In some embodiments, a client uses a command line interface to set a security policy using a web API supported by the policy management service 1304. The policy management service 1304 receives a web API request to apply a security policy and may perform one or more authorization and authentication procedures as part of fulfilling the request. The policy may be applied and stored in a policy repository 1306 where it can be retrieved for later use. In some embodiments, applying a policy and/or storing an applied policy to a policy repository 1306 generates a corresponding logging entry via a logging system. The logging system may be used to log some or all activities across a network, such as record information regarding web API requests made to a computing resource service provider.

An event 1308 may be generated in response to the application of a security policy or one or more downstream actions resulting from applying a security policy. For example, the event 1308 may be triggered by a web API call to apply a security policy, storing the policy in the policy repository, logging the application of the security policy and/or the storing of the policy to a policy repository, or some combination thereof.

An event-driven platform 1310 may determine when an event 1308 occurs and perform custom logic in response to the event being triggered. An event trigger may, for example, be detected when a policy is applied or may be determined at a later point in time, such as in cases where an asynchronous process (e.g., run daily) processes logging events and detects that a security policy was applied. The event-driven platform 1308 may be implemented using software, hardware, or some combination thereof. In some embodiments, distributed computing resources may provision and load custom logic/code in response to the event, run the code, and then unload the code and de-provision the computing resource. The event-drive platform 1308 may be a component of a computing resource service provider or may be a separate component.

An event-driven platform 1310 may be implemented using an event-driven architecture. When a specific event such as a web API request to apply a security policy occurs, the event-driven platform 1310 may be notified (e.g., by the authentication service) of that event and the event-driven platform may further receive additional information regarding the request, which may be obtained separately (e.g. from the policy management service that the request is directed towards). The event-drive platform 1310 may determine how to handle the event, which may be handled in part by custom code or logic that is selected based on information obtained about the request—for example, the custom logic may differ for security policies based on the type of resource that the security policy applies to. In some embodiments, the event-drive platform 1310 may subscribe to notification messages from the authentication service for events and the authentication service may invoke callback function (such as a lambda expression) in response to an event that the event-drive platform subscribes to receive notifications for.

The event-driven platform 1310 may receive the events 1308 and determine, either internally (e.g., using a component of the event-driven platform) or externally (e.g., by delegating to another service) how to handle the events. As an example, the event-driven platform may include rules regarding which, among a list of custom logics, should be invoked based on the specific type security policy that is being applied or other metadata associated with the security policy being applied. A mapping of security policy types to custom logics may exist. For example, a first custom logic may be invoked based on the security policy applying to a computing resource having a first service namespace and a second custom logic may be invoked based on the security policy applying to a computing resource having a second service namespace.

A policy monitoring service 1312 may be invoked by the event-driven platform 1310. In some embodiments, the event-driven platform 1310 invokes the policy monitoring service 1312 and provides context information regarding the security policy that triggered the event 1308, thereby allowing the policy monitoring service 1312 to perform various custom logics, for example, based on various parameters of the applied policy. For example, a computing resource service provider may support several services for various types of computing resources, and the set of best practice rules may differ based on the type of computing resource the security policy applies to. A policy monitoring service 1312 may determine a reference policy for a resource type and utilize a policy analyzer service 1314 to determine whether the applied policy is more permissive than the reference policy. The policy analyzer service 1314 may be in accordance with those described elsewhere in this disclosure, such as in connection with FIGS. 1-12.

If the policy analyzer service 1314 indicates that the applied policy is more permissive than the applicable reference policy, then the policy monitoring service 1312 may perform various mitigating procedures. For example, the policy management service 1304 may be notified that the web API request to apply the security policy is more permissive than a reference policy and instruct the policy management service 1304 to deny the request (i.e., refuse to fulfill the request). In some cases, fulfillment of the request to apply the security policy may be contingent upon the policy management service 1304 receiving an indication from the policy monitoring service that the request should be permitted. The requestor (e.g., the client) may be notified that the security policy of the request is too permissive. In some cases, the requestor is granted the opportunity to revise the security policy or apply it. Applying a security policy that is too permissive may result in a system administrator 1314 being notified, the security policy being logged to a separate system to be audited at a later time, and various other mitigations. Of course, other entities within an organization may be informed, such as a network security team and the like.

Figure 14:
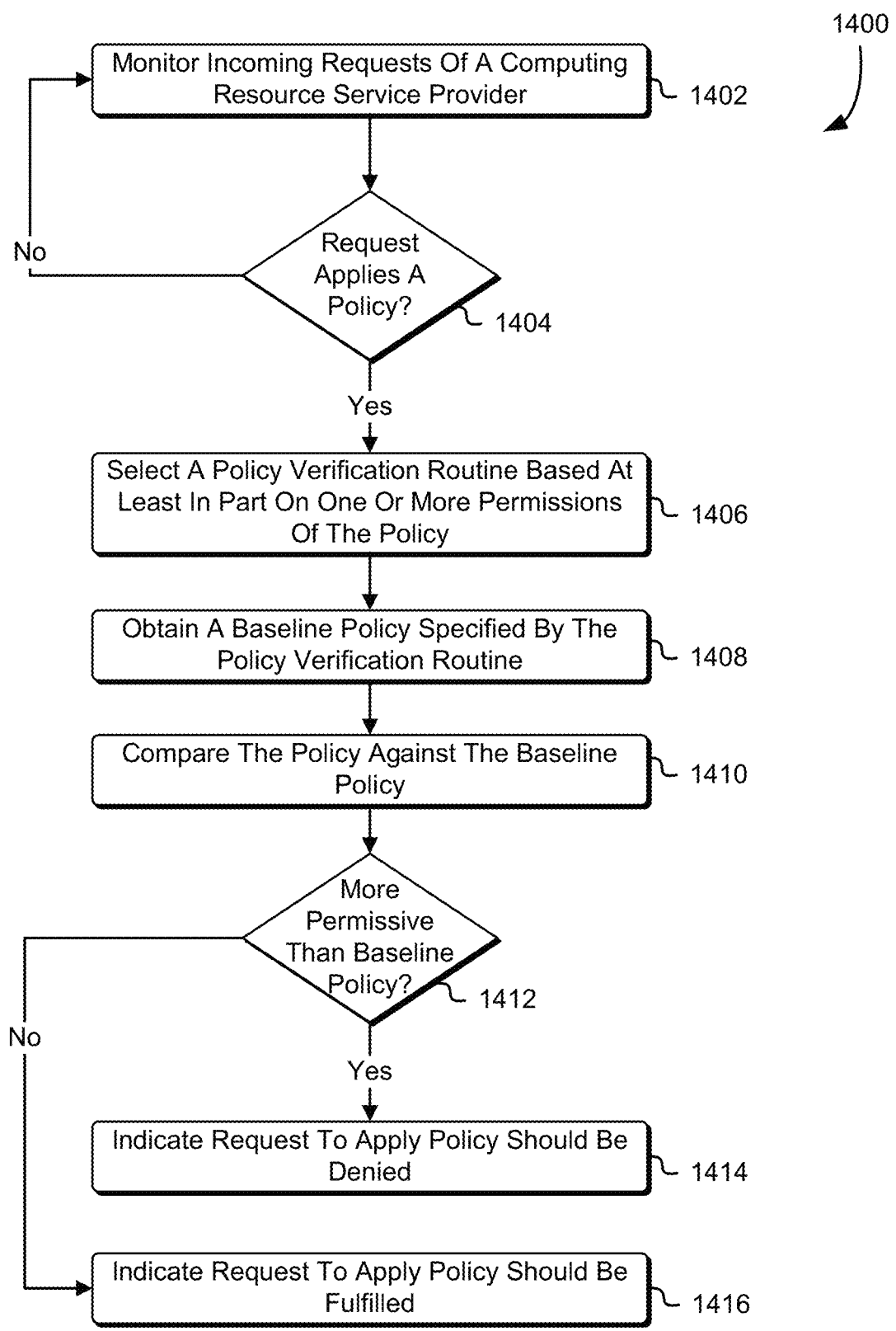
FIG. 14 shows a diagram illustrating a process for monitoring policies being applied to a system.

FIG. 14 shows an illustrative example of a process 1400 for monitoring policies being applied to a system. Generally, the process 1400 may be performed by any suitable system such as an event-driven platform described elsewhere in this disclosure, such as those described in connection with FIG. 13. The process may be implemented using hardware, software, or a combination thereof. In an embodiment, the process 1400 includes a monitoring routine. As an example, the system may monitor 1402 incoming requests of a computing resource service provider. A monitoring agent may be utilized to parse incoming traffic for requests (e.g., web API calls) and determine whether 1404 a request applies a policy. It should be further noted that in this context, the monitoring 1402 step may be an active monitoring process (such as in the case where a monitoring agent actively polls a logging system to determine whether requests have been received) or a passive monitoring process (such as in the case where a service frontend invokes the monitoring agent upon determining that an incoming request applies a policy).

More generally, a monitoring agent can be utilized to track the incoming requests themselves or downstream effects caused by the requests. For example, in some cases, web API requests to a computing resource service provider are parsed at a service frontend and distributed among several services of a computing resource service provider. In some cases, the monitoring agent may detect when a request is forwarded to a policy management service and parse those requests to determine whether a request applies a policy. As another example, some or all requests may be recorded in a logging system as the requests are received. The logging system may record information about the requests, such as the specific web API called, the parameters of the API call, and more. A monitoring agent may read the logs generated by requests to determine when a request applies a policy. Such a system may be performed either contemporaneous to the logging of the request or at a later point in time—for example, a monitoring agent may audit the logs once a day to check whether there are any policies in place which may violate rules imposed on the system.

If the system determines that a request does not apply a policy, then the system may continue to monitor requests. Alternatively, if the system determines that a request applies a security policy, the system may select 1406 a policy verification routine based at least in part on one or more security permissions of the security policy. For example, the policy verification routine may be selected from a list of policy verification routines based on the principal element of a security permission—a policy verification routine associated with guest or anonymous users may limit the maximally permissive set of privileges that a guest or anonymous user may receive. As a second example, a policy verification routine may be chosen based on a service namespace encoded in a resource element of a security permission—the maximally permissive set of privileges for a particular resource type as specified in the service namespace may vary from service to service.

Once a policy verification routine has been selected, the policy verification routine may be invoked. An event-driven platform may perform at least some of the steps in connection with selecting a policy verification routine and invoking the selected policy verification routine. One or more baseline policies may be obtained 1408 in connection with the selected policy verification routine. A system may have multiple baseline policies, and selection of one or more baseline policies may be based on the policy verification routine and the permissions attached to the security policy that triggered the policy verification routine to be invoked.

The one or more baseline policies obtained by the policy verification routine may be compared 1410 against the security policy being applied in the request. A reference policy may be selected based on various factors such as the input parameters of the web API request applying the policies. The baseline policies may be best practices policies that are determined to be a set of permissions which are should not be allowed. For example, a baseline practices policy may be that resources of a storage service should not be world-writeable (e.g., any principal, even a guest user or anonymous user can write to the container).

The system may determine whether 1412 the policy being applied by the request is more permissive than the reference policy. A policy analyzer service, such as those described in connection with FIGS. 1-4, may be utilized to compare the security policy being applied in the request against the reference policy. More generally, a constraint solver such as a SMT-based constraint solver (e.g., Z3) may be utilized to determine whether the security policy being applied in the request is more permissive or equally as permissive as a reference policy.

In some embodiments, determining whether the policy being applied by the request is more permissive than the reference policy may be performed using a fuzzer. A fuzzer may be a software module that includes executable code configurable to test software components by determining a set of inputs to an interface and verify that the outputs match expected values. For example, a fuzzer could be utilized to test the arithmetic operations of a processor by selecting a set of inputs from a lookup table and performing a set of operations (e.g., division) and verify that the results are correct based on an output lookup table. A fuzzer may select a set of parameters (e.g., a principal, an action, and a computing resource) and determine whether a request corresponding to the set of parameters would be fulfilled under the security policy of the request and the reference policy. If one policy would fulfill the request and the other would deny the request, then the relative permissiveness of the two policies may be determined (e.g., that one policy is more permissive than the other, the two policies are incomparable, and so on). In some embodiments, the fuzzer may have a predetermined list of parameters that it tests. In some embodiments, the fuzzer may randomly select sets of parameters.

If the system determines that the security policy of the request is less permissive than the reference policy, such information may be indicated. In some embodiments, when a policy management service receives a request to set a security policy, the security policy of the request may be analyzed in the manner described above to determine whether the security policy complies with applicable baseline policies. In some cases, fulfillment of the request (e.g., applying the security policy to a policy database) is contingent upon receiving an indication that the security policy being applied in the request is in compliance with any and all applicable policy verification routines. Thus, when a request to apply a security policy is received, the policy management service may wait for a response from the policy verification routine before fulfilling the request and the policy verification routine may provide an indication 1416 that the request should be fulfilled. However, this need not be the case—in some cases, the policy management service sets security policies without waiting for an indication from the policy verification routine.

Alternatively, if the system determines that the security policy of the request is more permissive than the reference policy, such information may be indicated. In some embodiments, an indication 1414 that the request should be denied may be provided. In some embodiments, a client may use a GUI to submit a request to apply a security policy. In response to detecting that the security policy of the request is more permissive than a reference policy, a failure code may be returned to the client, which may be presented in the GUI, for example, as a pop-up window. If a client uses a command line interface, the failure code may be presented in-line as text.

In some embodiments, the system may also provide a set of parameters that is sufficient to determine that the security policy of the request and the reference policy lack equivalency. A policy analyzer service such as those described in connection with FIG. 1-4 and utilizing techniques described elsewhere in this disclosure, such as in connection with FIG. 12.

If the security policy of the request and the reference policy are equivalent, then the system may perform various suitable actions. In some embodiments, it may be treated in the same manner as if the system determined that the security policy was more permissive than the reference policy. Alternatively, it may be treated in the same manner as if the system determined that the security policy was less permissive than the reference policy. How the system handles the case when the security policies are equivalent may be a configurable setting.

In some embodiments, there may be multiple baseline policies that the security policy is compared against. In such cases, the security policy being applied by the request may be compared against each reference policy individually. These comparisons may be made sequentially, as well as in parallel with each other.

Figure 15:
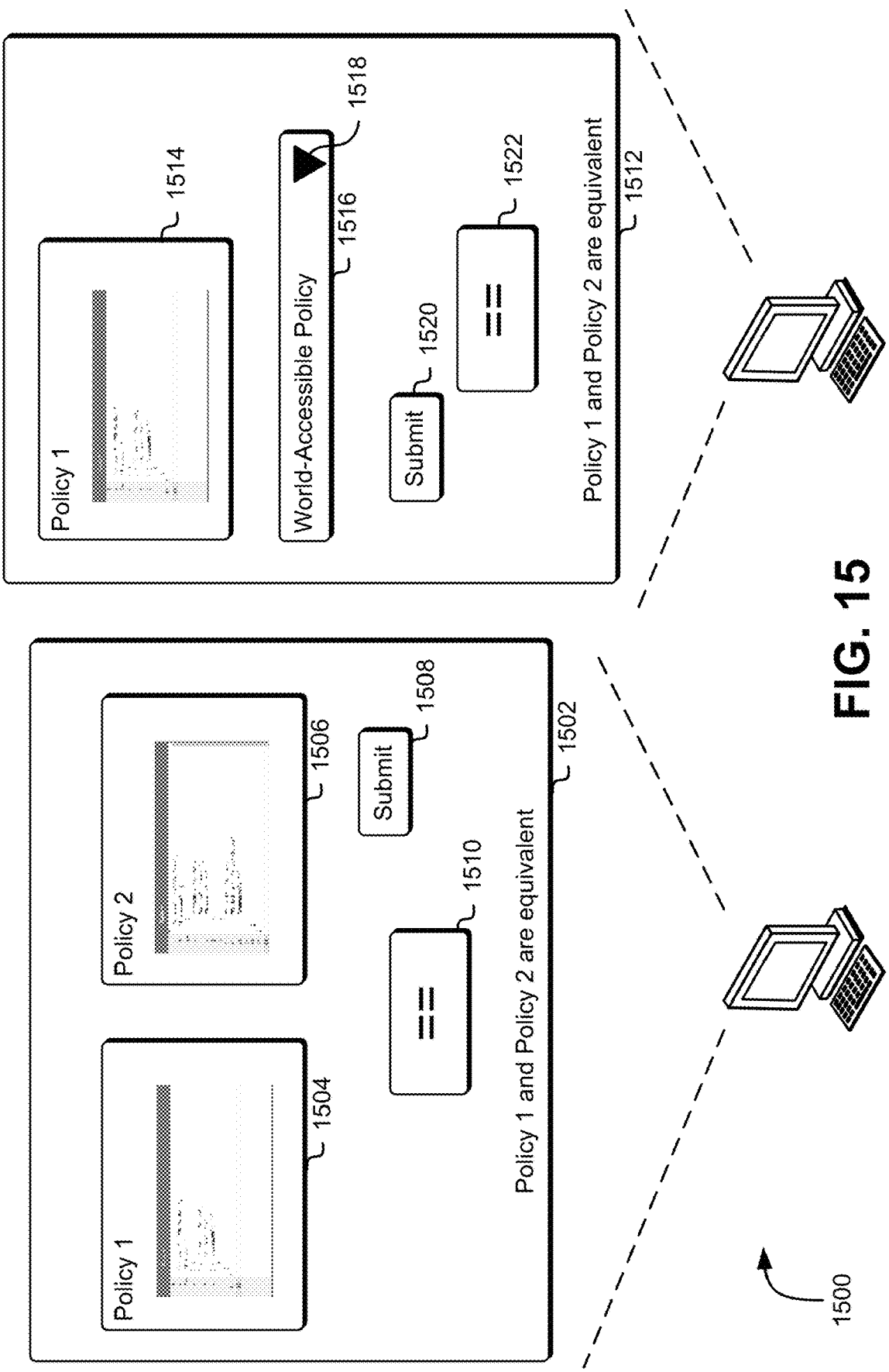
FIG. 15 shows a diagram illustrating graphical user interfaces in which various embodiments may be implemented.

FIG. 15 illustrates a diagram 1500 showing graphical user interfaces (GUIs) that may be implemented in accordance with embodiments of this disclosure. In some examples, a GUI may be implemented and presented to a user such as a client (e.g., those described elsewhere, such as in connection with FIGS. 1-4) via a client computing device. The GUI may be presented as part of a webpage, application, and more.

A first graphical user interface 1502 is shown in the diagram 1500. The first graphical user interface 1502 may include: a first input area 1504; a second input area 1506; a button 1508; and a visual indication 1510 of a result. The first input area 1504 may be an area of a GUI that a client can input a policy. For example, the first input area 1504 may be a text box in which a client may input a policy such as those described elsewhere in this disclosure. The client may input the policy in several ways, such as by typing the policy into the text box (e.g., using a touchscreen keyboard or a physical keyboard), by pasting a policy from a clipboard, and more. The GUI may further include a second input area 1506 that may support input mechanisms for a second policy that may be different from the policy that is inputted into the first input area 1504. The GUI may also include a button 1508 that, upon being pressed, may be utilized to analyze the permissiveness of the policies included in the input areas 1504 and 1506. For example, pressing the "Submit" button 1508 on a GUI presented to a client computing device may submit a web API request to a policy analyzer service (e.g., such as those described in connection with FIGS. 1-4) to compare the permissiveness of a first policy included in the first input area 1504 and a second policy included in the second input area 1506. A computing resource service provider, policy analyzer service, or other suitable system described elsewhere in this disclosure may be utilized to fulfill the request. A response to the web API request may be presented in the visual indication 1510 area as well as other areas of the GUI. For example, the GUI 1502 shown in FIG. 15 may present a visual indication 1510 that two policies are equivalent through two equal signs "==" and may also include text elsewhere in the GUI further explaining that the policies are equivalent. In some embodiments, a GUI may present additional information regarding the equivalency of two policies. In some cases, when two policies lack equivalency, the GUI may present a set of parameters that may provide an example of the two policies lacking equivalency. For example, the set of parameters may include a principal, action, and computing resource may be listed such that applying the first security policy to the set of parameters results in a first effect (e.g., access is granted) whereas applying the second security policy to the same set of parameters results in a different effect (e.g., access is denied).

A second graphical user interface 1512 is shown in the diagram 1500. The second graphical user interface 1504 may include: an input area 1514; a drop-down list 1516; a drop-down arrow 1518 that may be used to expand a drop-down list; a button 1520; and a visual indication 1522 of a result. The second graphical user interface may be implemented using techniques described above in connection with the first graphical user interface 1502. In some embodiments, the input area 1514 may be in accordance with those described elsewhere in this disclosure. The drop-down list 1516 may be a list of items that describe one or more predefined policies, such as reference policies discussed above. Items of the drop-down list may include descriptions of various predefined policies such as reference policies, and those descriptions may be mapped to the respective underlying policies, such as policies in JSON format. In some embodiments, the drop-down list 1516 may be expanded to show a multiple policies of the list by pressing a drop-down arrow 1518. As described elsewhere, the button 1520 may be utilized to submit a web API request to compare two policies. For example, when a client presses the "Submit" button 1520 shown in the second graphical user interface 1512, the system may submit a web API request to compare the policy included in the input area 1514 and a second policy that is obtained from a mapping that maps the drop-down list items to their corresponding policies. As a second example, when the client presses the button 1520, the system may submit a web API request that includes the input 1514 and an identifier corresponding to a predefined policy such as a reference policy, and a service receiving the request may perform a mapping of the identifier to a corresponding policy. A computing resource service provider, policy analyzer service, or other suitable system described elsewhere in this disclosure may be utilized to fulfill the request. A response to the web API request may be presented in the visual indication 1522 area as well as other areas of the GUI. For example, the GUI 1512 shown in FIG. 15 may present a visual indication 1522 that the policy of the input area and the policy of the drop-down list are equivalent through two equal signs "==" and may also include text elsewhere in the GUI further explaining that the policies are equivalent. In some embodiments, a GUI may present additional information regarding the equivalency of two policies. In some cases, when the policy of the input area and the policy of the drop-down list lack equivalency, the GUI may present a set of parameters that may provide an example of the two policies lacking equivalency. For example, the set of parameters may include a principal, action, and computing resource may be listed such that applying the security policy of the input area 1514 to the set of parameters results in a first effect (e.g., access is granted) whereas applying the security policy corresponding to the selected drop-down item to the same set of parameters results in a different effect (e.g., access is denied).

Figure 16:
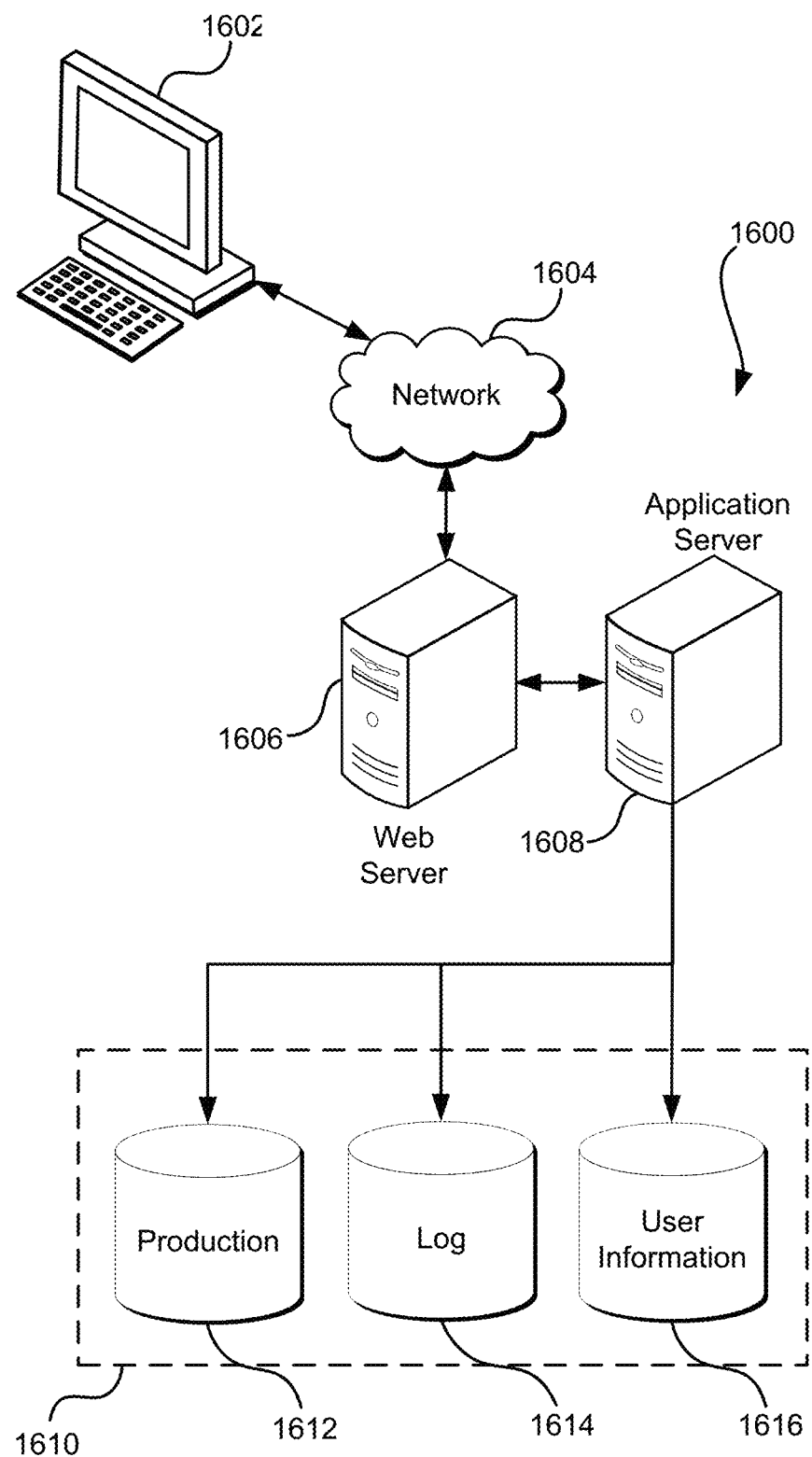
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    accessing a record from a log of application programming interface calls, wherein the record corresponds to an application programming interface call of the application programming interface calls;
    determining, based at least in part on the record, that the application programming interface call applies a first policy usable to grant or deny access to one or more computing resources;
    selecting, based at least in part on the first policy, a custom logic from a plurality of custom logics;
    provisioning a set of computing resources to execute the custom logic;
    executing the custom logic on the set of computing resources by at least:
        selecting a reference policy from a plurality of security policies based at least in part on a mapping between the plurality of custom logics and the plurality of security policies;
        determining a first propositional logic expression based at least in part on a first set of security permissions associated with the first policy;
        determining a second propositional logic expression based at least in part on a second set of security permissions associated with the reference policy; and
        parsing the first propositional logic statement and the second propositional logic statement to generate a set of constraints, wherein evaluation of the set of constraints indicates whether the first propositional logic statement is more permissive than the second propositional logic statement;
    de-provisioning the set of computing resources as a result of executing the custom logic; and
    in response to determining the first propositional logic expression is more permissive than the second propositional logic expression, performing a mitigation routine that modifies or revokes the first policy.

2. The computer-implemented method of claim 1, wherein a satisfiability modulo theories (SMT) solver is utilized as part of determining whether the first propositional logic expression is more permissive than the second propositional logic expression.

3. The computer-implemented method of claim 1, wherein the mitigation routine comprises denying access to at least one computing resource that the first policy enables access to.

4. The computer-implemented method of claim 1, wherein determining that the first propositional logic expression is more permissive than the second propositional logic expression comprises identifying a set of parameters wherein:
    the set of parameters identifies a principal, an action, and a computing resource;
    application of the first policy to the set of parameters results in access to the computing resource being granted; and
    application of the reference policy to the set of parameters results in access to the computing resource being denied.

5. The computer-implemented method of claim 1, wherein:
    provisioning the set of computing resources to execute the custom logic comprises initializing a virtual machine instance; and
    de-provisioning the set of computing resources comprises terminating the virtual machine instance.

6. A system, comprising:
    one or more processors; and
    memory that stores computer-executable instructions that, as a result of execution, cause the system to:
        determine, based at least in part on a plurality of obtained application programming interface calls, that an application programming interface call of the plurality applies a first policy usable to grant or deny access to one or more computing resources;

select, based at least in part on the first policy, a custom logic from a plurality of custom logics;
run the custom logic, wherein the instructions that cause the system to run the custom logic, as a result of execution, cause the system to:
select a reference policy from a plurality of predefined security policies based at least in part on a mapping between the plurality of custom logics and the plurality of predefined security policies;
determine a set of constraints based at least in part on a first mapping of the first policy to a first expression comprising propositional logic and a second mapping of the reference policy to a second expression comprising propositional logic; and
evaluate the set of constraints to determine a result, wherein the result is one of:
the first policy being more permissive than the reference policy;
the reference policy being more permissive than the first policy;
the first policy and the reference policy being equivalent; or
the first policy and the reference policy being incomparable; and
transmit information based at least in part on the result.

7. The system of claim 6, wherein the first expression further comprises first-order logic.

8. The system of claim 6, wherein a satisfiability modulo theories (SMT) solver is utilized as part of evaluating whether the set of constraints is satisfiable.

9. The system of claim 8, wherein a Z3 solver is the SMT solver.

10. The system of claim 6, wherein the instructions that cause the system to run the custom logic, as a result of execution, further cause the system to:
deny access to all computing resources that the first policy enables access to; and
provide an indication to an entity associated with the application programming interface call that applied the first policy that the first policy is more permissive than the second policy.

11. The system of claim 6, wherein the instructions that cause the system to run the custom logic, as a result of execution, further causes the system to provide an indication of a set of parameters, wherein:
the set of parameters comprises:
a principal;
an action;
a computing resource; and
a grant effect or a deny effect;
application of the first policy to the set of parameters grants access to the computing resource; and
application of the reference policy to the set of parameters denies access to the computing resource.

12. The system of claim 11, wherein the set of parameters further comprises at least one condition predicate that defines whether a corresponding policy is in effect.

13. The system of claim 6, wherein the reference policy is selected based at least in part on a service namespace associated with a computing resource encoded in the application programming interface call.

14. A non-transitory computer-readable storage medium storing executable instructions that, as a result of being executed by one or more processors of a computer system, cause the computer system to at least:
monitor a plurality of requests, at least some requests of the plurality applying security policies that grant or deny access to computing resources of a computing resource service provider;
identify a request of the plurality that applies a first policy;
select, based at least in part on the first policy, a custom logic from a plurality of custom logics; and
run the custom logic, wherein the custom logic causes the computer system to at least:
select a reference policy from a plurality of policies based at least in part on a third mapping between the plurality of custom logics and the plurality of policies;
determine a set of constraints based at least in part on a first mapping of the first policy to a first expression comprising propositional logic and a second mapping of the reference policy to a second expression comprising propositional logic;
determine whether the first policy is more permissive than the reference policy by evaluating whether the set of constraints is satisfiable, wherein a result of the set of constraints indicates one of:
the first policy being more permissive than the reference policy;
the reference policy being more permissive than the first policy;
the first policy and the reference policy being equivalent; or
the first policy and the reference policy being incomparable; and
in response to determining the first policy is more permissive than the reference policy, perform a mitigation routine.

15. The non-transitory computer-readable storage medium of claim 14, wherein the reference policy is a world-writeable policy.

16. The non-transitory computer-readable storage medium of claim 14, wherein a satisfiability modulo theories (SMT) solver is utilized as part of evaluating whether the set of constraints is satisfiable.

17. The non-transitory computer-readable storage medium of claim 16, wherein the set of constraints are encoded in a format in accordance with a SMT-LIB Standard.

18. The non-transitory computer-readable storage medium of claim 14, wherein the third mapping between the plurality of custom logics and the plurality of policies is based at least in part on a first service namespace being associated with a first custom logic and a second service namespace being associated with a second custom logic.

19. The non-transitory computer-readable storage medium of claim 14, wherein the reference policy is obtained from a predetermined plurality of security policies.

20. The non-transitory computer-readable storage medium of claim 14, wherein the executable instructions, as a result of being executed by the one or more processors of the computer system, further cause the computer system to perform the mitigation routine in response to determining the first policy and the reference policy are equivalent.

21. The non-transitory computer-readable storage medium of claim 14, wherein the executable instructions, as a result of being executed by the one or more processors of the computer system; further cause the computer system to perform the mitigation routine in response to the result indicating that the first policy and the reference policy are incomparable.

* * * * *